United States Patent [19]
Feeney

[11] Patent Number: 5,345,779
[45] Date of Patent: Sep. 13, 1994

[54] MODULAR FLOOR SUB-STRUCTURE FOR THE OPERATIONAL SUPPORT OF COMPUTER SYSTEMS

[75] Inventor: Edward K. Feeney, Worthington, Ohio

[73] Assignee: Liebert Corporation, Columbus, Ohio

[21] Appl. No.: 51,534

[22] Filed: Apr. 23, 1993

[51] Int. Cl.⁵ .................... F04H 9/00; F24F 13/10
[52] U.S. Cl. .................... 62/259.2; 62/265; 454/184; 454/186; 361/695; 361/699; 52/799; 52/126.1
[58] Field of Search .......... 62/259.1, 259.2, 237, 62/265, 285, 404; 454/184, 186, 187, 289; 52/79.9, 503, 126.1, 220.2, 261, 270; 361/695, 699

[56] References Cited

U.S. PATENT DOCUMENTS

| | | | |
|---|---|---|---|
| Re. 33,220 | 5/1990 | Collier | 52/263 |
| 2,867,301 | 7/1956 | Benton | 257/8 |
| 2,877,990 | 2/1954 | Goeman | 257/8 |
| 3,390,347 | 1/1976 | Megumi | 52/221 |
| 3,643,389 | 2/1972 | Sheppley | 52/79 |
| 4,508,162 | 4/1985 | Radtke | 165/56 |
| 4,566,235 | 1/1986 | Groll | 52/220.2 |
| 4,676,036 | 6/1987 | Bessert | 52/126.6 |
| 4,773,196 | 9/1988 | Yoshida et al. | 52/221 |
| 4,858,401 | 8/1989 | Thorp et al. | 52/100 |
| 4,874,127 | 10/1989 | Collier | 236/49.5 |
| 4,901,487 | 2/1990 | Rigby | 52/221 |

Primary Examiner—Henry A. Bennet
Assistant Examiner—William C. Doerrler
Attorney, Agent, or Firm—Mueller and Smith

[57] ABSTRACT

A modular floor sub-structure is provided wherein discrete floor modules having bottom surfaces and sides extending upwardly to support paired floor tile are interconnected to sit upon a floor surface and, in turn, support rack-mounted computer components. Select ones of the floor modules contain air cooling coils and blowers, while others are provided with uninterrupted power supplies and still others retain power distribution networks. The cooling system of a given module as well as the UPS components of another given module are provided having a capacity for supporting one computer component. Where more than one computer component is to be supported by the system, then additional modules are provided to develop an expanded elevated floor surface with power and heat removal servicing specific to each computer component. In one embodiment, a step arrangement is provided, the interior of which is utilized to retain flexible chilled water conduits for servicing the cooling coils within adjacently disposed floor modules.

41 Claims, 8 Drawing Sheets

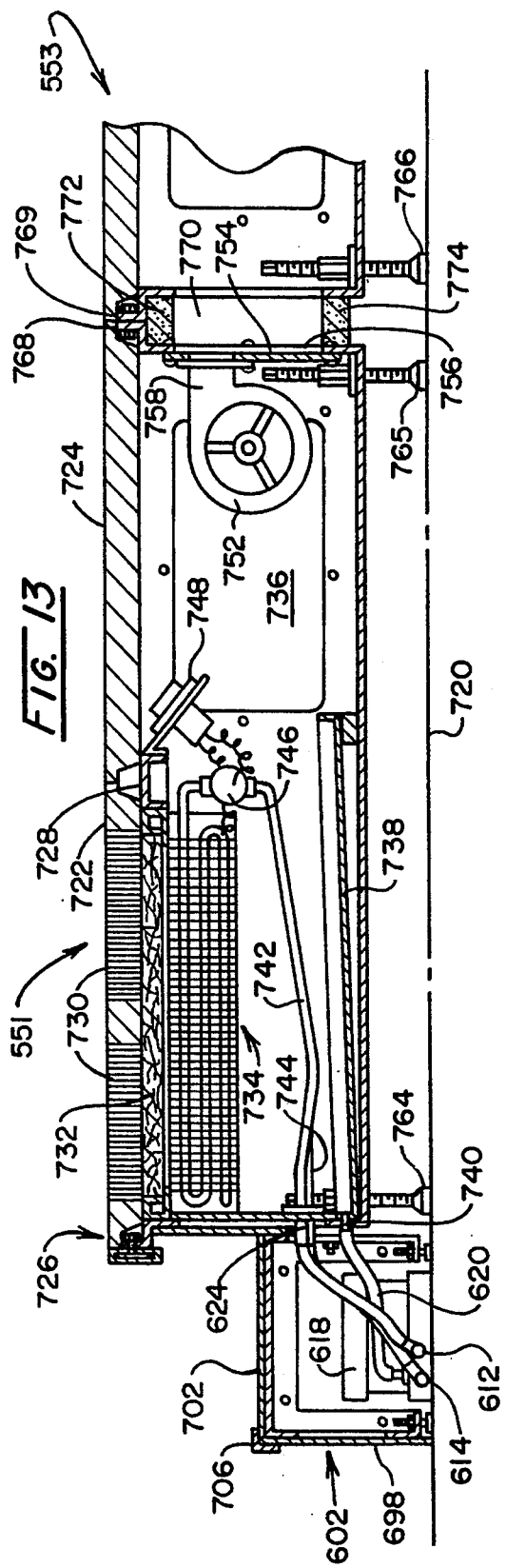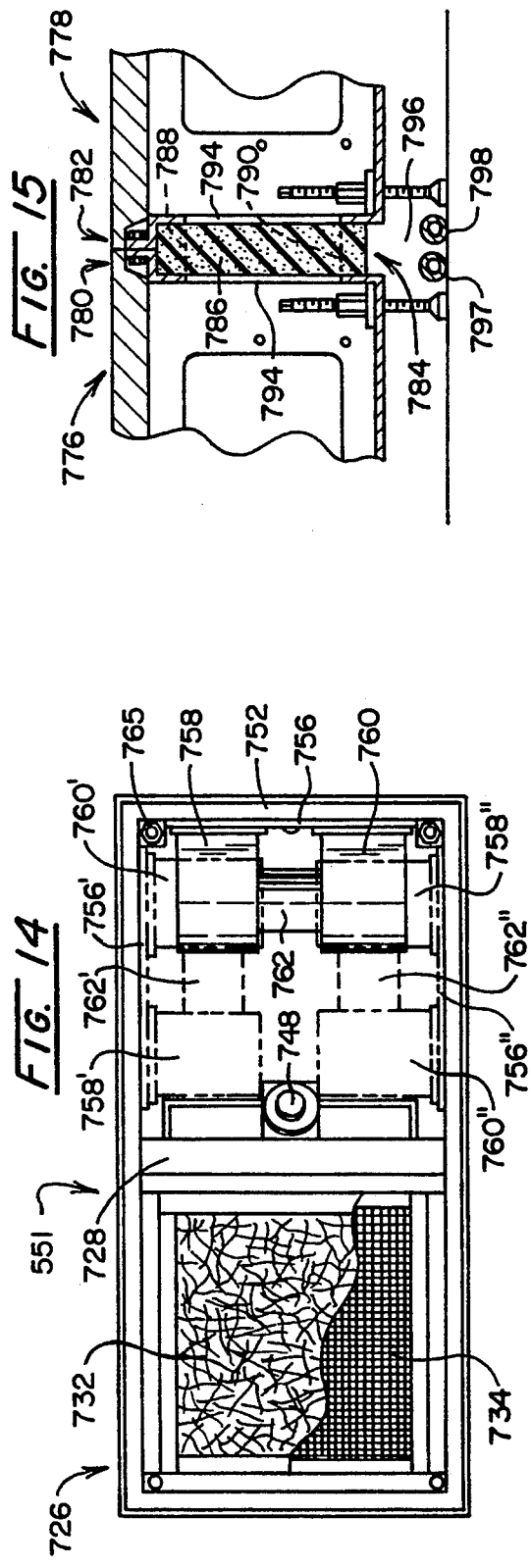

MODULAR FLOOR SUB-STRUCTURE FOR THE OPERATIONAL SUPPORT OF COMPUTER SYSTEMS

BACKGROUND OF THE INVENTION

Traditionally, industrial data centers have been designed to accommodate relatively large "mainframe" computer systems. These systems include stand-alone hinged cabinet contained control processing units, tape guide systems, disk drives, printers, control consoles, and the like. When assembled within a data center, the systems have required a relatively larger amount of floor area within a given building, as well as a carefully controlled environment. Control over that environment requires a dedicated, sealed computer room which is serviced by corresponding dedicated air-conditioning systems. In similar fashion, critical equipment within the room is serviced by dedicated uninterruptible power supplies. Because of the extensive amount of electrical interconnection required both for power supply and system communication, these computer rooms typically contain raised floors formed of tiles supported upon frames beneath which the complex cable networks can be laid. Generally, the provision of such computer rooms has represented a substantial financial investment on the part of the user.

Over the recent past, the computer industry has introduced processing systems employing more modern, modular electronics and supporting components permitting their rack mounted installation. Such modularized designs provide for substantial flexibility in accommodating for varying processing demands. For example, these systems readily are expanded incrementally as the growth of processing needs on the part of the user increases. As a consequence of improved design, such systems exhibit lower heat loads, lower noise output, and a compactness in packaging such that they are promoted for installation within the environment of a business office as opposed to a data center. One such system, for example, is identified under the trademark "AS/400", marketed by International Business Machines Corporation. This system offers a family of processor related modular units generally employing rack-mounted packaging. Cabinetry carrying the rack mounted modules will, for example, have nominal dimensions of 26 inches width by 36 inches depth, and 62 inches height. To facilitate their delivery to an intended operating location, they are supported for movement upon casters. With the racks fully loaded, the equipment may, for example, exhibit a heat load of 11,000 BTUs per hour, representing a demand for about one ton of air-conditioning. Similarly, the units will call for an uninterrupted power supply load capacity of about 3 KVA. These requirements, particularly when more than one component of a system is utilized (a typical case) generally cannot be accommodated by the in-place air-conditioning system of a building nor its in-place power capabilities. Thus, the user is called upon to find a technique of buttressing air-conditioning capacities, as well as power feeder inputs. Additionally, to accommodate for anticipated growth increments in such systems, in keeping with that aspect of the system design, the user must anticipate future air-conditioning needs, as well as future uninterruptible power supply needs. The result, in general, has been a resort on the part of the user to a conventional sealed computer room, an approach which essentially compromises many of the advantages of this modular form of processing system. Such computer room installations further may be called for where the office facilities within which the systems are installed are leased. Very often, the owners of such leased facilities will substantially shut-down building air-conditioning systems over weekends and the like much to the detriment of the data center. Thus, a dedicated environment is necessitated. Further, where computer rooms are installed within leased facilities, those dedicated rooms become fixtures and, without agreement otherwise, cannot be dismantled and transported to a new installation site.

As is apparent, the full advantage and flexibility of these newer modular computer systems can be recognized only when a corresponding flexible, modular support of their environmental and power input demands can be achieved on a practical cost basis.

SUMMARY

The present invention is addressed to a floor supported sub-structure system and module assemblage serving to operationally support computer system components, particularly of the incrementally expandable, rack mounted variety. Floor sub-structure assemblages of the invention are formed of interconnected, uniformly dimensioned floor modules, each with a frame with sides extending from a bottom surface to an outwardly offset connector flange structure. Two square floor tiles are carried at the connector flange structure by each module such that each defines a discrete internal chamber. The internal chamber of select ones of the floor module chambers contain modular operational support devices for dedicated use by corresponding computer system components. In this regard, air cooling coils and associated motor driven blower fans are installed in certain of the floor modules. The cooling coils within those modules are designed to accommodate the heat load of one computer component and, where utilized, an associated uninterruptible power supply (UPS) device. Because of the restrictive region of cool air flow utilized within the modular assemblage, and the lower heat loads involved with this form of computer component, these coils may be designed to avoid vapor condensation for most installations. UPS devices are positioned with the confines of the internal cavities of other select floor modules. These UPS devices are provided with a limited power capacity which is dedicated to the requirements of an associated computer component. By connectively associating a cooling coil containing floor module with one containing a UPS device, some of the generated cooled air may be directed to the UPS device in addition to being directed for its primary purpose into an associated and supported computer device. Still others of the floor modules are formed having a power distribution network mounted therein. These networks are designed, for example, to provide circuit breaker protected inputs for, for example, up to six UPS devices, or a computer component where those devices are not utilized. The networks also provide a source of power for a corresponding six blower fan motors and any associated condensation collection pumps.

Interconnection between adjacent floor modules is by bolting adjacent upwardly disposed flanges formed within their connector structures. Because these connector structures are outwardly offset from the sides of the modules, a gap is formed between any two adjacent modules. Leveling of the modules is carried out through the use of floor engaging foot structures which, in one embodiment permitting very low elevated floor heights provides a capability for retracting these foot modules entirely within the cavities of the modules themselves. For the latter embodiment, elevated floor heights as low as, for example, about 10 inches are achievable. To selectively direct air flow from the blower structures to outlets within other modules directed into the lower regions of the computer system components, panel openings are formed within the sides of the modules. These panel openings are selectively blocked to define air flow paths. To define the air flow paths between openings, an elastomeric expandable foam gasket arrangement is utilized. In one embodiment, a foam panel is provided which fits within the intermodule gaps and includes a partially die cut panel opening knock-out portion which may be removed where it is desired to establish an air flow path. The utilization of the gaps themselves facilitated the procedure for leveling the devices to establish a uniform and level elevated floor surface. In this regard, the gaps permit a modicum of flexure and tolerancing to enhance the installation procedure.

In another embodiment of the invention, the modules are formed with floor engaging foot structures extending below the bottom surface thereof and which are not retractable to the discrete cavities of each such module. This results in a cost benefit but a slightly higher elevated floor surface. Preferably utilized with this particular form of module is a step structure surrounding one or more sides of an assemblage of modules. By positioning those modules carrying cooling coils adjacent such outer side of the assemblage, the interior of the modular step structures can be employed to retain conduits carrying cooling fluids as well as any collected condensate from coils. This provides an advantageous separation of power distribution cabling from the conduits carrying fluid. In general, the conduits for carrying cooling water and the cabling for electrical distribution may be mounted within the intermodule gaps or, alternately, through the panel openings within the sides of the modules.

Movement of the caster mounted computer system components on and off off the substructure is provided through the use of a ramp assembly formed of two folding ramps which may advantageously be stored within an empty floor module. Additionally, :floor modules may be utilized to support an environmental confinement enclosure where the systems are employed in rigorous factory environments or where it is desired to employ a Halon based form of fire protection. By utilizing the restrictive enclosures, the amount of Halon required is held to an environmentally advantageous minimum.

Another feature of the invention is to provide a floor supported sub-structure system for a computer system component having a given base peripheral configuration with a base region through which heat removing air may enter, the system component having given operational heat dissipation and power consumption characteristics. The system includes a plurality of floor modules, each having a lower portion supported from the floor and having side portions extending upwardly therefrom to support an elevated floor surface at a given height and defining a discrete chamber intermediate the lower floor portion and the elevated floor surface. The elevated floor surface of a first floor module supports the computer system component and has an air outlet formed within it for providing air transfer communication to the base region of the computer component. A floor module discrete chamber of the system retains an air circulation blower having an input and an air flow output. An air path is defined by at least one discrete chamber of a floor module which extends from the blower air flow output to the air outlet. A second and third floor module of the system are positioned in adjacency with the first floor module and are oriented to effect a substantial alignment of the elevated floor surfaces thereof.

Another feature of the invention provides a floor supported sub-structure assemblage for a computer system component having a given base peripheral configuration with a base region through which heat removing air may pass, the system component having given operational heat generation and power consumption characteristics. The assembly includes a plurality of floor modules, each having a lower portion supported upon the floor and having side portions extending upwardly therefrom to support an elevated floor surface at a given height and defining a discrete chamber intermediate the lower portion and the elevated floor surface. The floor modules are arranged in an assemblage to form an elevated floor of predetermined peripheral geometric shape including a linear side portion. One floor module is provided having a side portion forming the assemblage linear side portion and having a cooling coil mounted within its discrete chamber which is connectable with cooling fluid conduits and which is located within an input air path extending to an air intake form within a module adjacent thereto. The elevated floor surface of a floor module supports the computer system component and has an air outlet formed therein for providing air transfer communication the base region of the component. A floor module discrete chamber of the assemblage retains an air circulation blower having an input for receiving air from the input air path and an air flow path as defined by at least one discrete chamber extending from the blower air output to the air outlet.

Another feature of the invention provides a floor module for use in assembling a floor supported substructure configured to support a computer system component having given operational heat generation and power consumption characteristics. The module includes a frame having a rectangular bottom surface and four side panels extended upwardly therefrom to an edge portion defining four corners and having air transfer openings formed therein, and a flange connector structure including a seat flange extending horizontally outwardly from the edge portion to an upstanding connector flange. A vertically adjustable floor engaging foot component is mounted to the frame in the vicinity of each of the corners, while at least one floor tile is positionable upon the frame over the seat flange which defines with the frame a discrete cavity. A blocking arrangement is positionable in abutment with select ones of the panels for blocking the flow of air through an adjacent air transfer opening.

The invention, accordingly, comprises the system and apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 4 is a sectional view taken through the plane 4—4 in FIG. 3;

FIG. 5 is a sectional view taken through the plane 5—5 shown in FIG. 3;

FIG. 13 is a partial sectional view taken through the plane 13—13 shown in FIG. 11:

FIG. 14 is a top view of a floor module shown in FIG. 13 and additionally showing alternate blower fan orientations;

FIG. 15 is a partial sectional view of a floor module assemblage described in connection with FIG. 11 showing an alternate intermodule insert arrangement:

DETAILED DESCRIPTION OF THE INVENTION

Figure 1:
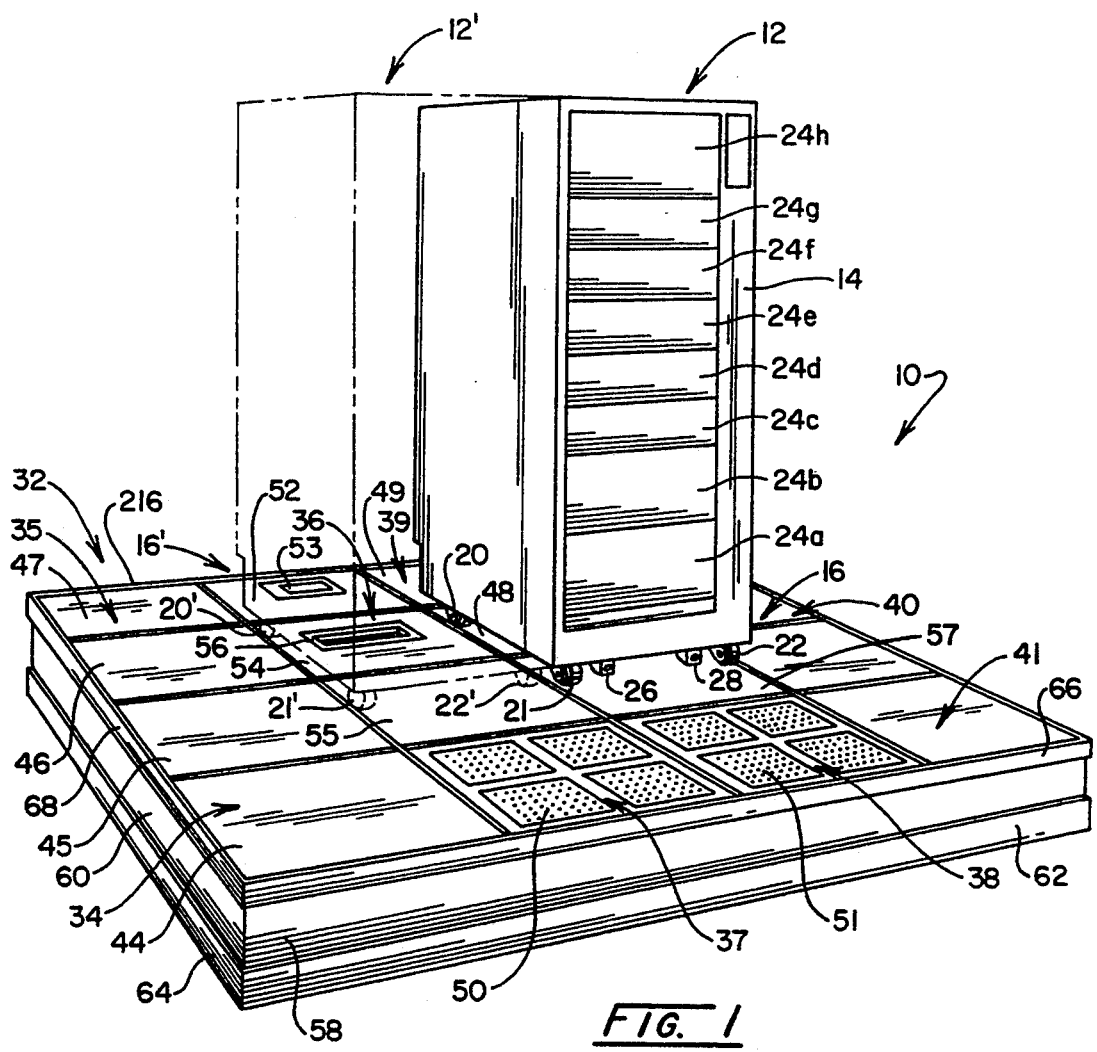
FIG. 1 is a pictorial representation of a system employing an assemblage of floor modules according to the invention and supporting two computer system components, one being shown in phantom to reveal floor structuring.

Referring to FIG. 1, the floor supported sub-structure system of the invention is revealed generally at 10. System 10 as depicted, represents a somewhat minimal configuration for use in the heat removal and power input support of a component of a computer system, for example, as represented at 12. Component 12 is of a rack mounted variety, having an upright housing 14 supported from a base region as represented generally at 16 which, in turn, is supported upon rolling wheels or casters at each corner thereof, three of which are represented at 20-22. Within the housing 14 are a sequence of pull-out racks 24a-24h which may be pulled out in the manner of a drawer by attending personnel. To avoid causing the component 12 to tilt forward when one or more racks 24a-24h are pulled out, an L-shaped forward brace (not shown) is attached to the housing 14 at brackets 26 and 28 following the positioning of housing 14 upon system 10. The base region 16 of the device 12 is rectangular and has a nominal dimension of 26 inches in width, 36 inches in depth, and 62 inches in height. For the arrangement shown, the system 10 is assembled to provide support to two adjacently disposed such components 12, the next adjacent component being represented in outline fashion and in phantom at 12' as being supported upon casters 20'-22' and having a base region 16'. Components 12 and 12' preferably perform in conjunction with an uninterruptible power supply (UPS) which, in turn, receives a utility power input from a feeder line and a distribution network which is circuit breaker protected. These devices may, for example, present a heat load of about 11,000 BTUs per hour to the environment within which they are operating.

System 10 permits the components 12 and 12' to be used as originally intended, i.e. within an office environment without requiring the revision of the air conditioning system thereof and without requiring the procurement of the UPS system having capacities anticipated for future expansion.

Figure 3:
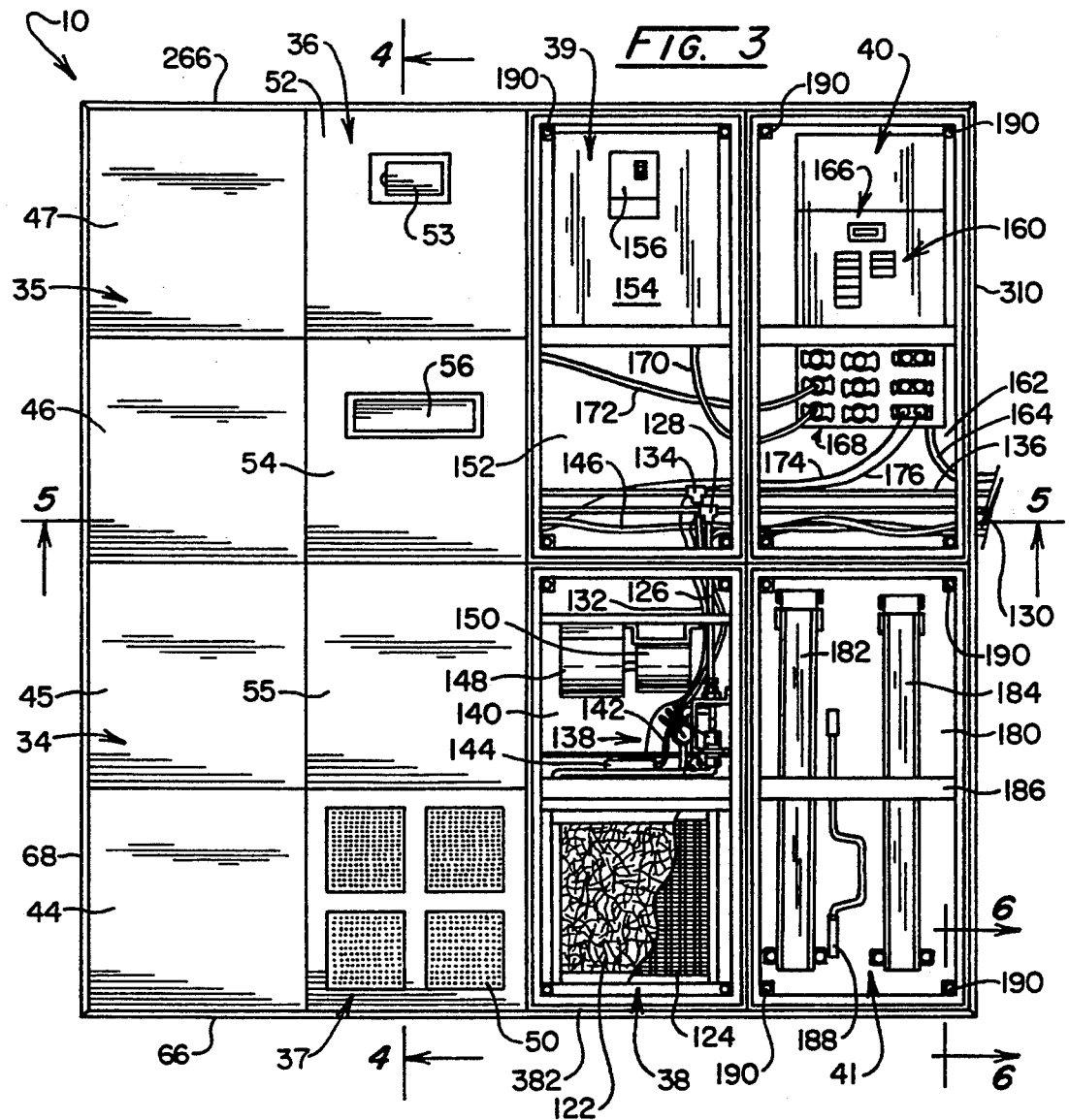
FIG. 3 is a plan view of the floor assembly shown in FIG. 1 with portions removed and broken away to reveal internal structure.

FIG. 1 reveals that components 12 and/or 12' are supported upon an elevated floor represented generally at 32 which is formed of an assemblage of eight floor modules seen in FIGS. 1 and 3 at 34–41. While each of the modules 34–41 is formed having a frame component of standardized dimension and shape, certain of them will contain conditioners for air such as chilled water cooling coils or the like which are contained, for example in modules 37 and 38, as well as UPS systems as are located within modules 36 and 39 in the system of FIGS. 1 and 3. Each of the modules 34–40 is formed to support two rigid floor tiles which, for example, may be for a variety employed within conventional computer room false floors. Generally, these floor tiles will be 24 inches square in dimension. Two such floor tiles, for example those provided in conjunction with module 34, are seen at 44 and 45. Similar, contiguous tiles are provided in conjunction with modules 40 and 41. However, modules 37 and 38, in addition to conventional tiles 55 and 57, will be seen to contain such tiles as are shown at 50 and 51, each carrying a pattern of air entry holes or openings providing for an air input to the cooling coils immediately therebeneath. For modules 36 and 39, in addition to providing a portion of the support for respective components 12 and 12' also contain a compact uninterruptible power supply essentially encompassing about one-half of their lengthwise dimension. Accordingly, tiles such as that shown at 52 in the case of floor module 36 are configured having a door opening 53 which provides convenient access for the operator to observe UPS readouts such as status as to whether the devices are under battery drive or utility drive, and the current power load being imposed. The adjacent tile 54 within floor module 52 contains an air outlet 56 through which cooled air may flow into an appropriate base region of the computer component 12'. An identical arrangement is provided with respect to computer component 12 as provided from floor module 39. The outer exposed sides of the assemblage of system 10 are covered with a side panel or fascia, two of which are seen at 58 and 60 in FIG. 1. Additionally, extending up from the floor level for the exposed sides of the assemblage are polymeric baseboards, two of which are shown at 62 and 64. In similar fashion, the upper edges of the sides of the assemblage are covered with a kick panel formed of a polymeric material, two of which are seen in FIG. 1 at 66 and 68.

With the arrangement thus shown, the components, for example as at 12 and 12' may be placed within a conventional office environment and will be supplied with adequate cooled air for heat removal, distributed power, and, where desired, an uninterrupted power supply. No computer room construction is required. In general, a cooling arrangement within one module is designed to provide the capacity for one such component 12. The UPS systems are similarly designed for dedicated use with one component. Thus, it may be observed that the modular system readily grows with incremental growth of the overall facility. The height of the elevated floor 32 for the embodiment shown may be as minimal as about 10 inches, a height generally representing a step height. Preferably, the assemblage represented by system 10 will provide for adequate floor space to permit personnel access to the components as at 12 and 12'. For some installations, it further may be desirable that the components 12 or 12' rest upon floor tiles which need not be removed for maintenance access to support devices and systems contained within the modules. However, the "footprint" or square footage demanded by the system illustrated is so conveniently small as to permit its use within facilities having more restricted area availability. In this regard, for the example shown in FIGS. 1 and 3, the entire installation has a footprint dimension of about 8'×8'. Of advantage in addition to the modularity and expandability, the system 10 easily is removed from one facility or building to another and does not constitute a fixture.

Figure 2:
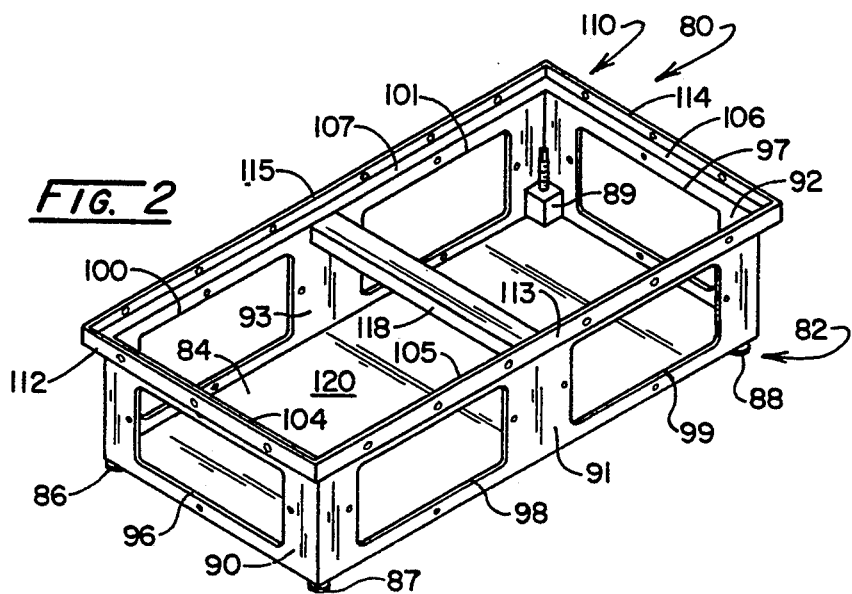
FIG. 2 is a perspective view of the frame components of a floor module as may be employed with the assemblage shown in FIG. 1.

Looking to FIG. 2, the frame component of a floor module is represented generally at 80. Formed, for example, of sheet steel which is welded to achieve the configuration shown, the frame component 80 is seen to have a lower portion represented generally at 82 which is supported upon the floor and includes a rectangular continuous bottom surface 84 downwardly from the corners of which floor engaging adjustable toot components are provided. Three of these components are shown at 86-88, while the upward portion of the fourth thereof is seen at 89. Extending upwardly from the bottom 84 are side portions provided as panels 90-93. A single, rather large rectangular opening is formed within the end or shorter side panels 90 and 92 as represented, respectively, at 96 and 97. In similar fashion, lengthwise panel 91 is seen to have two spaced-apart openings 98 and 99 formed therein and oppositely disposed parallel side panel 93 is formed having rectangular openings 100 and 101 arranged in aligning symmetry with respect to openings 98 and 99. Panels 90-93 extend to respective top edges 104-107 whereupon they are bent to extend outwardly and upwardly to develop a connector flange structure represented in general at 110 and having upstanding connector flanges 112-115. Spaced connector holes are seen located within these connector flanges 112-115 which are used to receive floor module interconnecting nut and bolt assemblies. Positioned between the upper panel edges 105 and 107 is a cross-over support 118 which is used not only to provide structural support for panels 91 and 93, but also to serve as a rest for one edge of each floor tile of the two such floor tiles utilized with each module. The floor tiles, not shown, which are positioned over the connector flange structure 110, in general, mutually abut over the cross-over support 18. To improve their noise free positioning, a thin elastomeric gasket (not shown) may be positioned over the horizontal offset portions extending outwardly from top edges 104-107. Small holes are provided in conjunction with each of the openings 96-101 for the purpose of receiving machine screws holding sheet metal panels which serve to selectively close off these openings depending upon the form of air path desired within such systems as at 10. In effect, each of the modules as at 80 provides a discrete cavity therewithin as represented generally at 120.

Referring to FIG. 3, typical uses for such cavities as at 120 are revealed. In the figure, the floor tiles 51 and 57 are seen to be removed from module 38 to reveal an air cooling arrangement. In this regard, note that an air filter 122 is shown in broken away fashion to reveal a cooling coil 124 positioned immediately beneath it. For the embodiment shown and for installations generally encountered, the type of cooling provided by coil 124 is based upon chilled water or appropriate fluid. Thus, conducting is extended to the coil 124 as represented by conduit 126 extending to a T connection 128 which, in turn, is coupled to a feeder input 130 which, typically, will be connected to an externally disposed (outdoor) chiller component. Line 130 also is seen to extend into floor module 36 for purposes of providing chilled water to a similar air cooling coil within adjacent floor module 37. Return water from the coil 124 is provided through conduit 132 which, in turn, extends to T 134 and to output line 136. Line 136 extends to a waste water disposal outlet within the building within which system 10 is installed. Line 136 also provides the similar return function with respect to the cooling coil of module 37. Control over chilled water input to the coil 124 for the instant embodiment is provided by a relatively simple vacuum or pneumatically based valve represented generally at 138 which is located within the cavity 140 of floor module 38 in combination with filter 122 and coil 124. Because of the relatively small temperature difference between the cooled air from coil 124 and ambient air temperature, a simple control of this nature becomes available. Immediately beneath the valve 138 within cavity 140 is a flexible hose 142 which extends from a condensate pump 144 outwardly from the system 10 for disposal as waste water. A similar flexible hose 146 is seen extending outwardly from the system. Hose 146 is associated with the cooling coil mounted within floor module 37.

Also disposed within discrete cavity 140 of floor module 38 is an air blower fan 148 which, in turn, is driven from an electric motor 150. By blocking the air transfer openings, for example as described at 98, 99, 100 and 101 in FIG. 2, as they are provided at floor module 38 as well as blocking the opening, for example corresponding to opening 96 in FIG. 2 adjacent coil 124 and inserting appropriate gaskets, the input of blower 148 will establish an air flow path extending through the openings within floor tile 51 (FIG. 1), thence through the coil 124 to the input of blower 150 and thence as pressurized from the output thereof to exit through the mutually disposed panel openings at the abutting juncture of floor modules 38 and 39. To further define the air flow path, the corresponding panel openings of floor module 39 are blocked such that the discrete chamber 152 thereof becomes a plenum and cooled air may exit through an opening therein formed identically to that shown at 56 in floor tile 54. The blowers as at 148 may provide, as a minimum, about 450 cubic feet per minute of air movement. In addition to the panel openings at the elongate sides of floor module 39 being closed, the discrete cavity 152 of module 39 also contains an uninterruptible power supply (UPS) 154 which, preferably, is of a capacity wherein it is dedicated to the computer system component 12. In this regard, the device 154 may have a capacity, for example, of 3 KVA. As noted in connection with module 36, UPS 154 has an upwardly disposed switching and readout panel 156 which is located directly beneath an access door as described at 53 in conjunction with tile 52.

Floor module 40 is bolted to floor module 39 along adjacent portions of their connector flange structures as described in connection with FIG. 2. Module 40 is provided having a power distribution network 160 formed within the discrete cavity 162 thereof. The network 160 is coupled to the utility feeder inputs, for example, represented at cable 164 and provides a circuit breaker function including circuit breakers 166 and plug connector outlets represented generally at 168. These outlets at 168 provide discrete power inputs as shown at cables 170 and 172 to the UPS components within respective floor modules 39 and 36. Additionally, power is supplied, as represented at lines 174 and 176, to the fan motors within respective floor modules 38 and 37. One distribution network as at 160, with 100 ampere service, in general may serve up to six computer components, for example employing dedicated LIPS components, condensation pumps, and blower drive motors. Thus, one main breaker and seven branch breakers are employed with the unit. In the latter regard, six of the breakers are operationally associated with computer components while one such breaker services all fan and condensation pump motors utilized.

Certain of the floor modules of the system 10 serve a storage function retaining servicing tools and the like. For the system shown at 10, such a function is assigned to floor module 41 which is bolted at abutting flange connector assemblies adjacent modules 38 and 40. The discrete cavity 180 of module 41 is seen to contain a ramp assemblage formed of two ramps 182 and 184 which, in turn, are formed of hinged ramp members which may be folded as depicted to fit within the confines of cavity 180 and beneath, for example, the crossover supporting member 186. Also contained in the cavity 180 is a socket wrench 188 which is employed for adjusting the floor engaging foot components as described in connection with FIG. 2 at 86-89. Certain of these foot components are seen in FIG. 3, for example, at 190 at the four corners of each of the floor modules. Modules 36 and 37 are connected to and abut against corresponding respective modules 39 and 38, and are selected having identical functions for supporting computer system component 12'.

Referring to FIG. 4, the architecture involving the connecting of two modules 36 and 37 is revealed in sectional detail. Note that the abutting upstanding connector flanges 200 and 202 of respective floor modules 36 and 37 are bolted together as represented by bolt connector 204. Flanges 200 and 202 correspond with those described at 112 and 114 in FIG. 2, three bolted connections being employed. When so connected, the adjacent side panels shown respectively at 206 and 208 are spaced apart to define a gap between the abutting floor modules 36 and 37. This structuring developed from the offset nature of the connector flange assembly facilitates the leveling of modules 36 and 37 to achieve a level floor surface 32. It additionally may be observed that the connector structures accommodate for the shape of the floor tiles. Note in this regard that floor tiles 54 and 55 mutually abut over the upstanding flanges 200 and 202. To achieve this abutment, it may be observed that the peripheries of all of the floor tiles are formed having double offsets, one offset serving as the connective or abutting surface for load transmission, while the next offset surface extending to an uppermost abutting edge. At the center of the floor modules, the floor tiles rest upon a cross-over support as earlier-described in connection with FIG. 2 at 118. Such crossover supports are shown at 212 and 214 in connection with respective floor modules 36 and 37. As before, the abutting edges of the floor tiles are in mutual contact, while the lower offset supporting surfaces rest upon supports as at 212 and 214. At the outside edges of the system 10, the outer abutting edges of the tiles, for example files 50 and 52, are covered by kick panel 66 in the case of tile 50 and 216 in the case of tile 52.

Looking to the operational components and their association within the paired floor modules 36 and 37, the discrete cavity 218 of floor module 37 is seen to incorporate the cooling coil 220 of an air chiller system. Above coil 220 is a filter which is located immediately beneath floor tile 50. Floor tile 50 incorporates a plurality of air duct openings represented at 224. Immediately beneath the coil 220 is a condensate collection pan 226 which is slanted downwardly to provide a condensate receiving region 228 within which a condensate pump 230 is located. Concerning the presence of condensation, coil 220 preferably is designed such that only a minimal occasion for condensation development is present. In this regard, the range of incoming fluid temperatures to the coil will be from, for example, 45° F. to as high as 60° F. In designing the coil, an operational envelope is chosen with respect to the number of rows and area of the coil that, for essentially most room conditions, the coil will remain dry. However, in certain geographic areas, the humidity levels are so high that the condensate pan 226 will be utilized. In general, the pump 230 is arranged to turn on when a float actuated switch therein responds to about 0.75 inch of water within the region 228.

Positioned forwardly within the discrete chamber 218 of floor module 37 is a blower fan 232 having an input at 234 and an output at 236. Driven by an electric motor (not shown), similar to that described at 150 in FIG. 3, the fan 232 establishes an air path as represented by the arrows in the drawing. In this regard, air is drawn through the air duct openings 224 of floor tile 50 as represented at arrows 240 and thence through the filter 222 and cooling coil 220. Then, the air, as represented, for example at arrow 242, enters the input of blower 234 and exits from the output 236 thereof as represented at arrow 244. Arrows 244 represent that the air is drawn through adjacent openings of the side panels of floor modules 36 and 37 at the gap 210. To assure the integrity of this air path, elongate elastomeric foam gaskets 246 and 248 are positioned at the top and bottom of gap 210. The air then enters the discrete cavity 250 of floor module 36 and exits, as represented by arrow 252, through opening 56 into the appropriate receiving base region of computer system component 12'. Air blower and motor combinations also can be installed within a floor module to direct air outwardly from a panel opening at an elongate module side.

The discrete cavity 250 of floor module 36 additionally includes a dedicated uninterruptible power supply (UPS) 254 having power input at cable 172 and a conditioned output which is coupled to component 12', for example via cable 256 which extends through the air outlet opening 56. Note, as represented by arrow 258, that the arrangement permits the flowing of air across the UPS device 254 to aid in heat removal therefrom.

The air paths thus described are defined by gasketing and the selective closure of the panel openings as earlier described at 96–101 in connection with FIG. 2. In this regard, the enclosure of the outside widthwise opening 260 of floor module 36 is by a thin sheet metal panel cover 262 which is connected to the module by sheet metal screws. That particular edge of the system 10 is considered to be unobservable being, for example, positioned adjacent a wall or the like. The correspondingly opposite end of the arrangement, for example opening 264 within floor module 37, is closed by side panel or side fascia 58. Select ones of the intervening openings are closed with panels as at 262. For example, these openings will include those shown at 266 and 268 at floor module 37. The oppositely disposed openings of module 37 also are covered in the same manner. However, to provide for the air path as represented at arrow 244, openings 270 and 272 remain uncovered. In the case of floor module 36, outboard openings 274 and 276 are closed, however, the openings disposed oppositely therefrom are open to permit air flow toward a discrete cavity 162 of floor module 40 as described in conjunction with FIG. 3. This permits a modicum of heat removal with respect to that component. However, all panel openings of the storage model 41 described in that figure are blocked.

Turning to FIG. 5, the interrelationship of the floor modules of system 10 again is represented. Note that the internal cavity 280 of outboard floor module 35 is enclosed on one side by external panel 60 and the remaining openings thereof are closed by covers, for example as at 282 and 284. Modules 35 and 36 are bolted together at their upstanding connector flanges to provide a coupling represented generally at 286. Note that opposite cover 284, the discrete cavity 250 of floor module 36 is blocked by a cover 288 to define a gap 290. No gaskets or the like are provided within the gap 290 inasmuch as no air path definition is required. Floor module 35 functions to provide access floor space for the users of the computer center.

The upstanding flange components of floor modules 36 and 39, as they occur longitudinally therebetween are bolted together to define a coupling represented generally at 292 providing a gap 294. Oppositely disposed side openings of modules 36 and 39 at gap 294 remain open and the air path therebetween is established by spaced elastomeric foam gaskets 296 and 298. Similarly, the abutting upstanding flanges along the corresponding longitudinal edges of floor modules 39 and 40 are joined together at a coupling represented generally at 300 to define a gap 302. To provide for the earlier-noted air flow about distribution network 160, the panel openings adjacent gap 302 are not blocked and the air path therebetween further is defined by elastomeric foam gaskets 305 and 306. It may be observed that the gaskets at 305 and 306 or 296 and 298 as well as those described in connection with FIG. 4 permit movement between adjacently coupled floor modules while still providing for the definition of air flow paths cool air is directed to component 12 through outlet 299 in floor tile 54. In general, the panel openings within the entire periphery of the assemblage or system 10 will be blocked either by covers or fascia boards, the latter being described, for example, at 58 and 60. External panels are provided, as shown in FIG. 4 at 262 or at FIG. 5 at 308. To provide for the pneumatic integrity of the discrete cavity 162 of floor module 40 at the point of entry of cooling fluid and electrical utility input, an external conduit port 312 may be included with such panels as at 306. The upper kick panels generally are provided around the entire assemblage, one such side kick panel being shown at 310 in FIG. 5.

Figure 6:
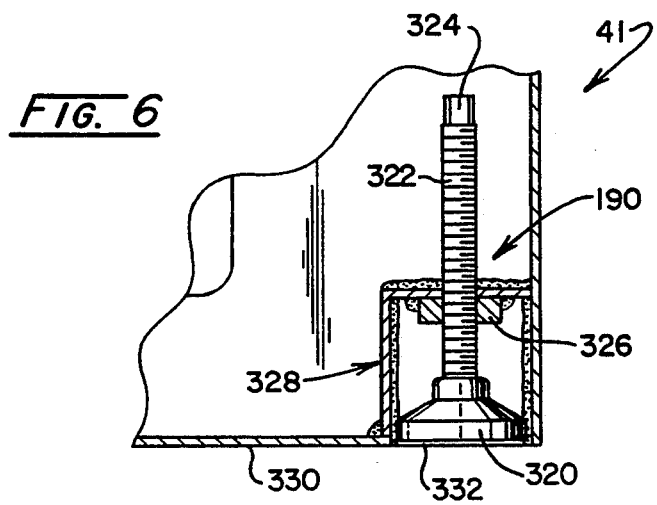
FIG. 6 is a partial sectional view taken through the plane 6—6 shown in FIG. 3.

Considering the leveling procedure itself, reference is made to FIG. 6 where one embodiment of a foot component 190 of a leveling component, for example as used in conjunction with floor module 41, is displayed. Foot component 190 is seen to include a floor engaging lower foot 320 which is coupled to an elongate threaded stud 322 which extends to an integrally formed hexagonal nut portion 324. Stud 322 is threadably engaged within a threaded bearing block 326 which, in turn, is welded to a box-shaped steel support represented generally at 328 and welded to the bottom 330 and corner-defining sides of module 41. Thus, employing an elongated wrench as at 188 as shown in FIG. 3, the installer may rotate the stud 322 from nut portion 324 to move the assemblage 190 inwardly through an opening 332 formed within bottom surface 330. This arrangement permits the bottom surface of at least one of the floor modules to be positioned directly against the supporting floor to assure that the elevated floor surface 32 of the assemblage 10 is at a minimum height, for example, about 10 inches. Where greater elevated floor surface heights are available, then the foot 320 of the assemblies may be normally positioned below the bottom surface 330, an arrangement which is less expensive but which promotes greater elevated floor surface heights. For the latter applications, the cavity defining structure 328 is replaced, for example, by a solid steel component which may have a cross section which is round or rectangular depending upon the desires of the user.

Figure 7:
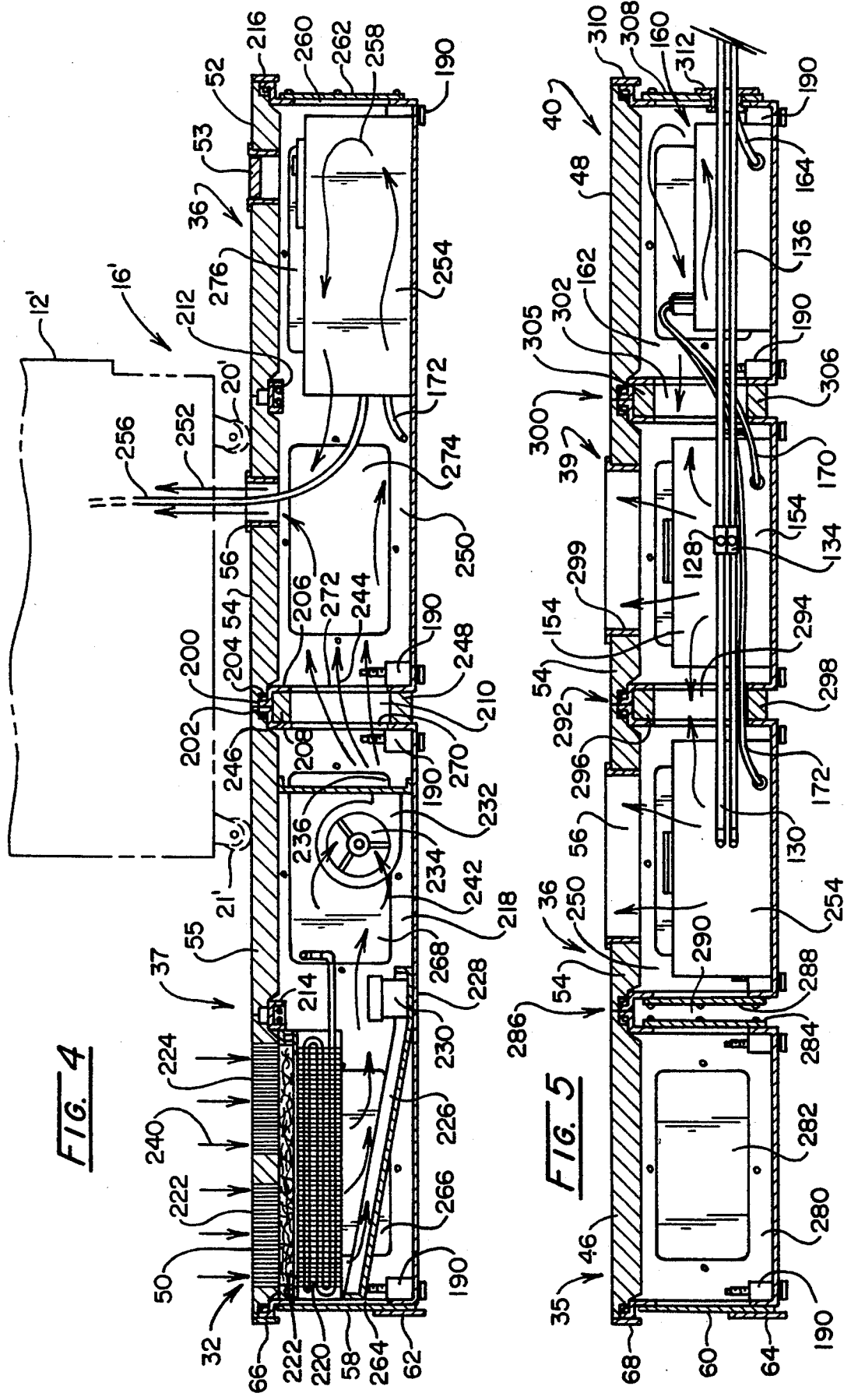
FIG. 7 is a perspective view of the system of FIG. 1 showing employment of a ramp structure for moving computer system components to and from the floor module assemblage.

An advantage of the modular assemblage of components of the system 10 resides in a capability for rearranging the floor modules depending upon changing processing requirements and/or changes in the geometry of the floor region available for the data center function. These alterations may require the movement of computer system components as at 12 off of and on to the elevated floor surface 32. Because a using entity typically will not have rigging equipment or the like to move these components about and only limited storage capacity, the instant system provides the foldable ramp assemblage which has been described as being storable within the discrete cavity of an otherwise "empty" floor module as at 41. In general, the components themselves are movable upon casters or wheels as described in conjunction with FIG. 1, for example at 20–23. Additionally, the computer system components 12 may have an expected maximum specified weight of about 1800 pounds. Manufacturers further recommend that movement to the elevated floor surfaces 32 be along an inclined ramp or the like having about a 1:8 inclination. Thus, for the nominal 2 ft.×4 ft. size of the floor modules of the invention, a ramp pair is provided which is foldable to fit within the lengthwise extent of a given floor module. Looking to FIG. 7, the racks 182 and 184 are shown operationally positioned with respect to the system 10. Accordingly, the same numeration provided in the figures heretofore described is supplied, where appropriate, in the figure. These ramps are identically structured, in this regard, ramp 182 is formed of two upwardly facing channel members 340 and 342. Members 340 and 342 are hingedly coupled together at a hinge 344 and one such member, for example ramp member 340, is configured having two oppositely disposed L-shaped brackets 346 and 348 extending downwardly therefrom. The outward flange of each of these L-shaped brackets 346 and 348 is configured to threadably retain a foot assembly as shown, respectively, at 350 and 352. Assemblies 350 and 352 may be structured in the same manner as the foot structure including foot 320, threaded stud 322, and hex nut portion 324 described in connection with FIG. 6. That end of ramp member 342 opposite hinge 344 is, in turn, pivotally coupled to channel shaped bridging member 354 at a hinge connection 356. Bridging member 354 is of a length serving to span over a removed floor tile which, for the instant demonstration, would have been floor tile 51 as described in FIG. 1. The end of the bridging member 354 oppositely disposed from hinge 356 is seen to rest upon the next adjacent floor tile 57. Bridging member 354 additionally is coupled to a downwardly depending flange engaging coupler represented at 358 which serves to stabilize the ramp 182.

Figure 8:
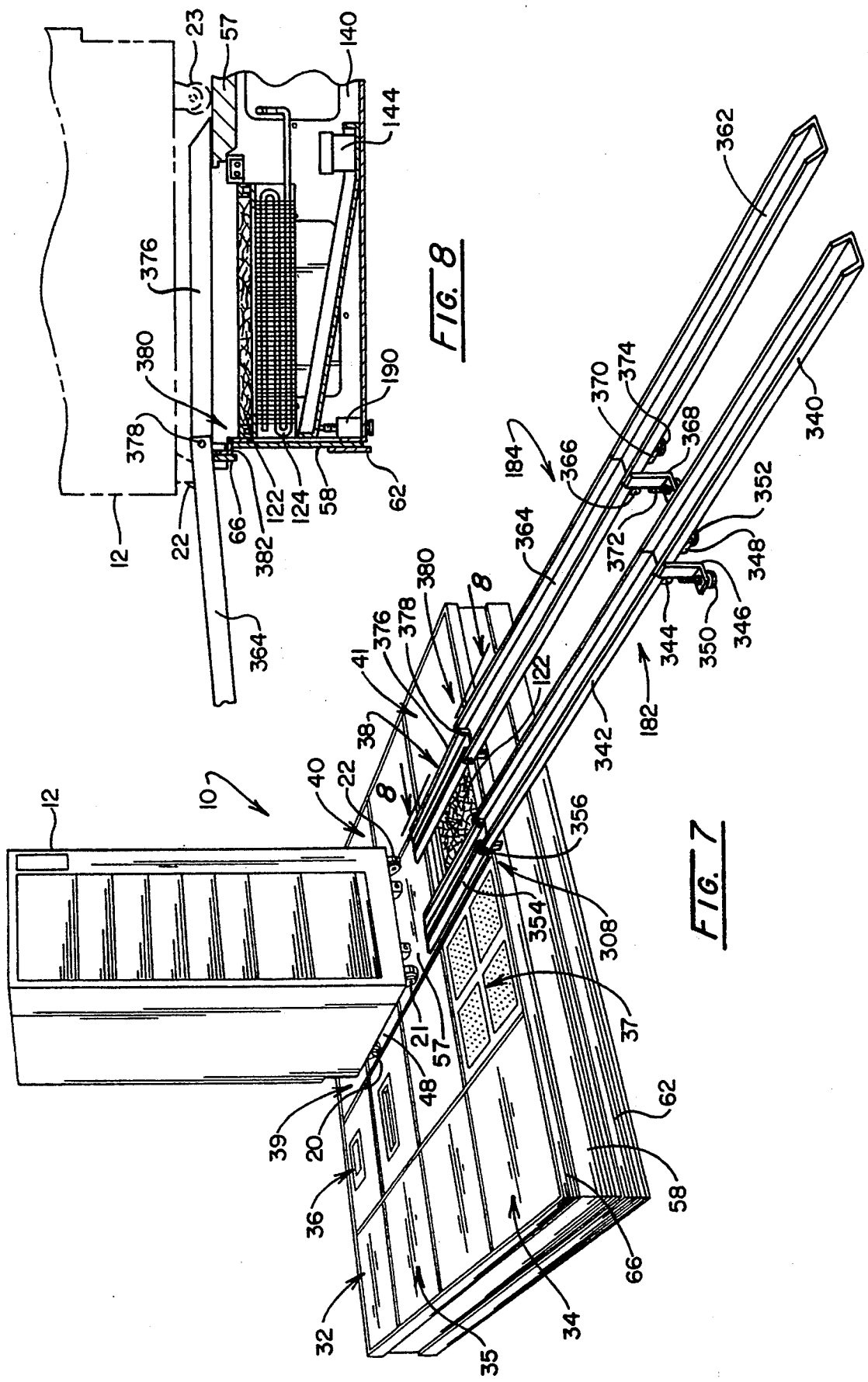
FIG. 8 is a partial sectional view taken through the plane 8—8 shown in FIG. 7.

Ramp 184 is identically structured, including ramp members 362 and 364 which are hinged together at a hinge connection 366. The extended ramp is supported at the hinge connection 366 by assemblies formed of L-shaped bracket members 368 and 370 which, in turn, support floor engaging foot assemblies represented, respectively, at 372 and 374. As represented additionally in FIG. 8, a bridging member 376 is pivotally connected to one end of ramp member 364 at hinge 378. As before, bridging member 376 spans the region encompassed by the necessarily removed floor tile. A flange engaging coupler is provided, as shown in general at 380, which is seen to be formed of downwardly depending bifurcate members which extend over the upstanding connector flange 382 (FIG. 8) as well as kick panel 66. Ramps 182 and 184 are positioned so as to be aligned for the reception initially of casters 21 and 22 and then casters 20 and 23 of computer system component 12.

Figure 9:
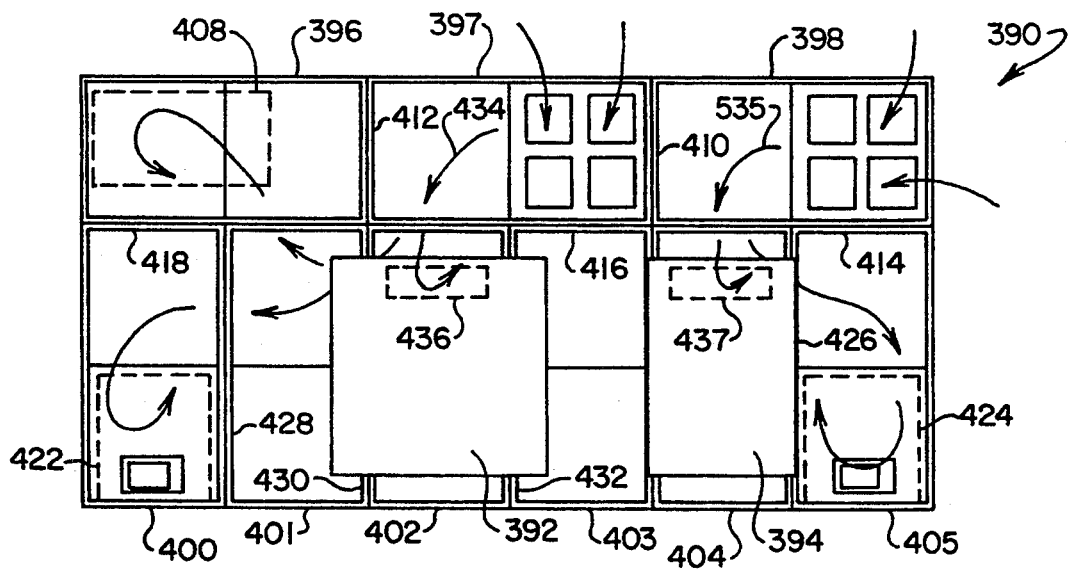
FIG. 9 is a top view of a system according to the invention showing an assemblage of floor modules with enhanced support component access.

The configuration of FIG. 1 represents a somewhat minimal one for the purpose of operationally supporting two computer system components as at 12 and 12'. With this configuration, the accessing of supporting floor modules containing equipment for conditioning air, or UPS systems requires that the computer system components be moved to clear the appropriate region for floor tile removal and access. While the components for conditioning air and UPS systems have a high reliability and a corresponding long mean time between failures, for many installations it is desirable that the floor tiles over such components be removable without any requirement for temporarily relocating the computer system components. With the addition of only one empty floor module, such a feature is accomplished. Referring to FIG. 9, an assemblage of nine floor modules achieving this desirable aspect is revealed, in general, at 390. Assemblage 390 is seen to operationally support two computer system components 392 and 394 in a manner wherein the floor modules beneath the components are empty, i.e. do not contain operation supporting instrumentalities. With the arrangement shown, a sequence of three floor modules 396–398 are coupled end to end as a linear array and against one side of this array there are positioned and connected a side-by-side array of six floor modules 400–405. Components 392 and 394 are located over empty floor modules 401–404, those modules being customized to this combination only by gaskets and the select closure of panel openings as described earlier. Positioned outwardly and readily accessible through their associated floor tiles, floor modules 397 and 398 are configured for developing conditioned air in the same manner as modules 37 and 38 heretofore described. The preferred direction for the outlet of the air circulation blowers within floor modules 397 and 398, respectively, is represented by the arrows 434 and 436. This is achieved by the relatively simple expedient of turning the fan assemblage, for example motor 150 and blower 148 as shown in FIG. 3 by 90°. Similarly, floor module 396 is configured for retaining a power distribution network and is structured identically as module 40. The power distribution network is represented in dashed form at 408. Air path development with modules 396–398 is provided initially by the closure of all panel openings about the outer periphery of the assemblage 390. Additionally, the panel openings are blocked at the connecting sides of the modules as represented at 410 and 412. Correspondingly, the panel openings are closed at the abutting sides 414, 416, and 418. The latter blockages may be observed to cover one-half of the panel openings within modules 396–398. Floor modules 400 and 405 each carry a dedicated uninterruptible power supply as represented, respectively, at 422 and 424. As noted earlier, it is desirable to circulate some of the cooled air towards those UPS devices. Accordingly, the panel openings in the abutting sides between modules 404 and 405 as represented at 416 remain unblocked as do the sides between modules 400 and 401 represented at 428. Similarly, the sides abutting between modules 401 and 402 as at 430 are unblocked, while the sides represented at 432 between modules 402 and 403 are blocked. With the arrangement shown, two distinct air zones occur, one dedicated to the computer system component 392 and its associated UPS component 422 as well as the power distribution component 408. Computer system component 394 receives conditioned air from module 398 and that air also is directed to its dedicated UPS component 424. Floor tiles carrying outlet openings 436 and 437 are seen located in respective floor modules 402 and 404. This is for an orientation where the forward or facing surface of the computer components 392 and 394 are away from the triad of floor modules 396–398. Where the components 392 and 394 are positioned to face the opposite direction, then the floor tiles carrying outlet openings 436 and 437 would be positioned at the opposite location within the respective modules 402 and 404.

Figure 10:
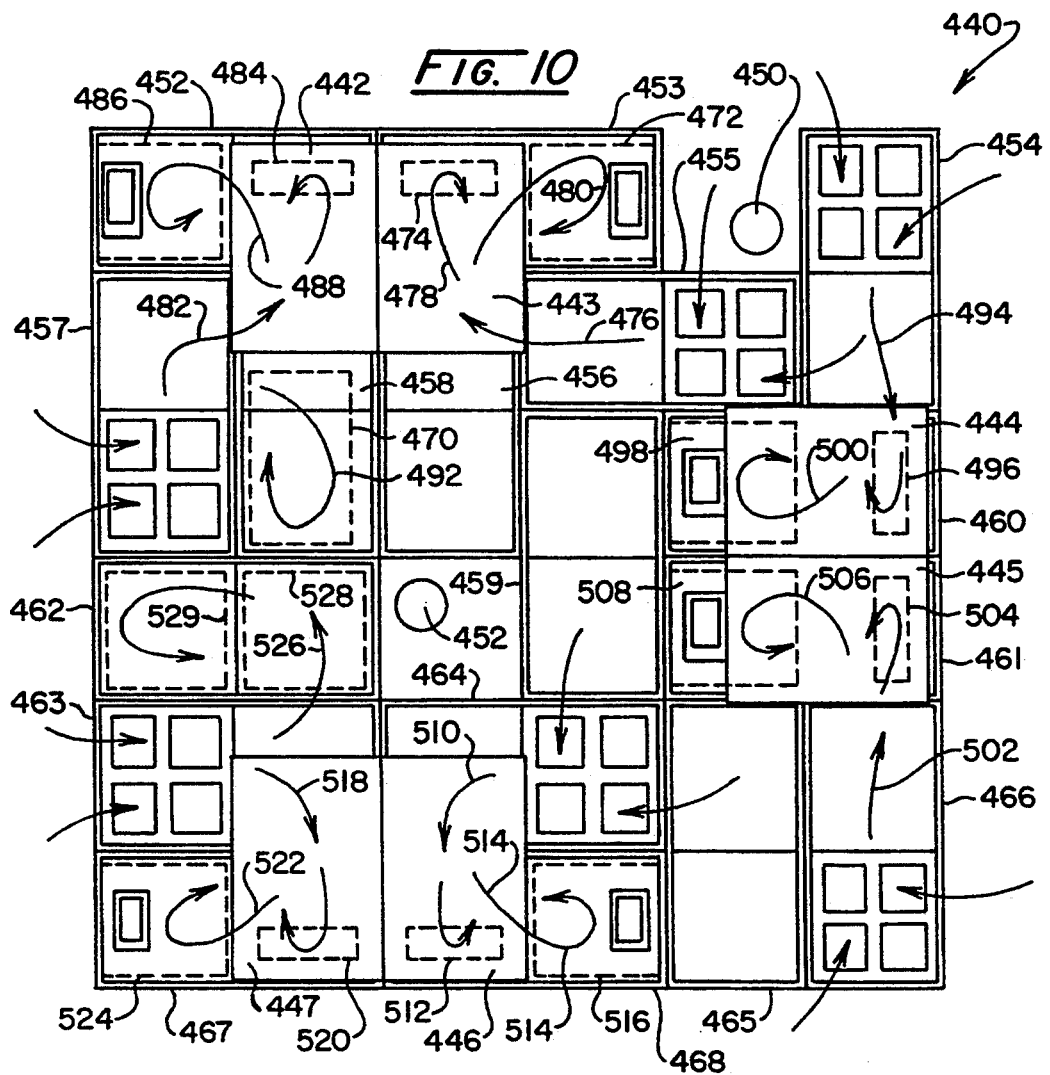
FIG. 10 is another top view of an assemblage of floor modules according to the invention showing the flexibility thereof to accommodate for varying available facility areas.

Looking to FIG. 10, the flexibility of the system at hand is illustrated in conjunction with an assemblage 440 of side-by-side computer system components 442, 443; 444, 445; and 446, 447. Of interest, the assemblage 440 provides support for these three pairs of components within a floor area having two columns or similar obstructions as represented at 450 and 452. Floor module assemblage 440 is made up of 15 floor modules identified at 452–466.

Within the assemblage 440, module 458 retains a power distribution network as represented by the dashed boundary 470. This is the same network as described at 160 in connection with FIG. 3 and provides power distribution to six computer system components and their associated blower fan motors. Component 443 is seen to be positioned over empty floor module 456 as well as module 453 containing UPS apparatus 472. In this regard, one floor tile of floor module 453 is arranged so as to provide an air outlet as represented in dashed fashion at 474. Conditioned air for these modules is developed from module 455 having an air blower arrangement configured to blow air in the direction generally represented by arrow 476, which is seen to extend through an open panel within module 456, as represented by arrows 478 and 480 to the air outlet 474 and the UPS component 472. Panel openings are blocked along the elongate side of module 456 as it abuts with module 458. Additionally, panel openings at the abutting widthwise edges of floor modules 452 and 453 are blocked to achieve the noted air pathway.

Computer system component 442 is serviced by the conditioned air provided by floor module 457, the blower fans of which are oriented to provide an output as represented at arrow 482, the panel opening at that location being unblocked, while all other panel openings of the module are blocked. Air path arrow 482 is seen being directed towards the air flow outlet 484 located within floor module 452. That floor module also retains a UPS system represented at 486 which, as shown by arrow 488, also is subjected to some of the conditioned air flow. In addition to the component 442 and UPS system 486, conditioned air module 457 also supplies air circulation about power distribution network 470 as represented at arrow 492. Network 470, as described in connection with module 40 in FIG. 3, retains sufficient capacity to provide circuit breaker protected service to each of the UPS systems, as well as to the blower fan and condensation pump motor within the assemblage 440.

Computer system component 444 is serviced with conditioned air from floor module 454 as represented at arrow 494. The air path thus is developed through a panel opening adjacent module 460 which also includes an air outlet 496 and a UPS device 498. Circulation of air to device 498 is represented at arrow 500. With the exception of the open panel located to confront arrow 494, all panel openings of floor module 460 are blocked.

Computer system component 445 receives conditioned air from floor module 466 as represented by arrow 502 indicating a pathway to air outlet 504. To establish the appropriate air path, all panel openings of the module 466 are closed except at confronting arrow 502. Additionally, as represented by arrow 506, air is circulated about UPS device 508 which is located within module 461. Module 465 is empty and provides for a continuous floor surface. The module is located adjacent to one end of floor module 464 which contains a coil for producing conditioned air and a blower fan which is oriented within the module to direct air in the direction indicated by arrow 510 toward air outlet 512 within adjacently disposed floor module 468. As represented by arrow 514, air also is circulated to a UPS device 516 within module 468. To develop the air path shown, all panel openings are blocked with the exception of those within modules 464 and 468 which confront the arrow or path 510.

Computer system component 447 receives conditioned air from the cooling coil and blower components within floor module 463. For this embodiment, however, two blower fans may be installed within the module 463, one oriented to direct air along the arrow 518 toward air outlet 520 within module 467. That air flow, as represented at arrow 522 also provides an air path to UPS device 524 within module 467. To provide for the air flow thus described, the side panel openings confronting the air path represented at line 518 are open. A second blower fan within module 463 also provides an air flow as represented at arrow 526 into floor module 462. Floor module 462 contains two assemblages of storage batteries 528 and 529 which function to add operational time to one or more of the UPS devices within the assemblage 440. These batteries are sealed such that in normal operation no hydrogen gas leakage occurs. To provide the air path to module 462, the side panel openings confronting arrow 526 are open within floor modules 462 and 463 while all other side panel openings within floor module 462 are blocked. A dual blower assemblage is revealed later herein in connection with FIG. 14.

Figure 11:
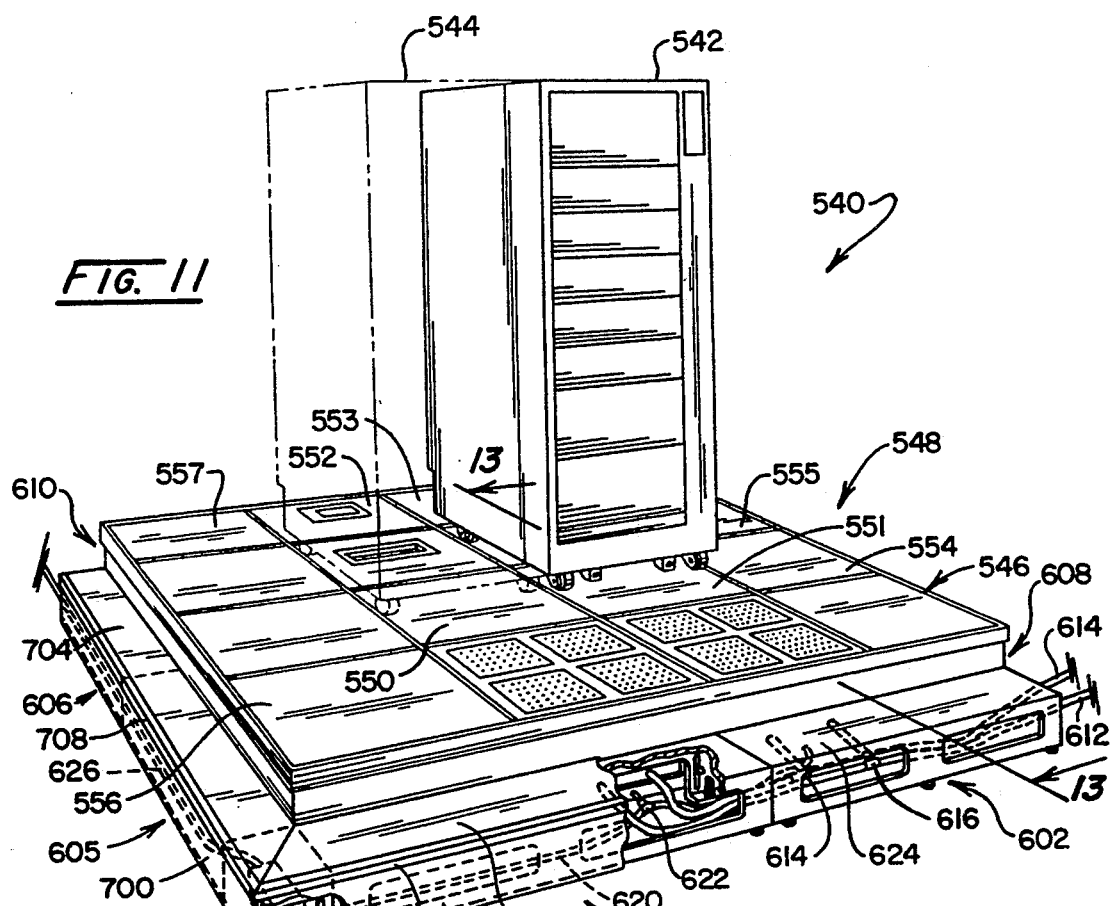
FIG. 11 is a pictorial view of another embodiment of the invention showing the floor module assemblage formed in combination with a step structure.

Referring to FIG. 11, another embodiment of the system of the invention is represented in general at 540 supporting two adjacently positioned computer system components as shown at 542 and in phantom outline at 544. Components 542 and 544 are supported by caster wheels upon the even elevated floor surface 546 of an assemblage 548 of interconnected floor modules 550–557. These floor modules are dimensioned, for example, having at top surface dimension suited for retaining two 2 ft.×4 ft. floor tiles in the same manner as described above in connection with FIGS. 1 and 2. In particular, the supporting functions of the assemblage 548 are identical to those described in connection with FIGS. 1–3, for example floor modules 550 and 551 supporting cooling coils and one or more fan blowers, while end connected modules 552 and 553 provide air outlets and UPS devices. Similarly, one other module of the grouping thereof including modules 554–557 contain a power distribution network with circuit breaker protection.

Figure 12:
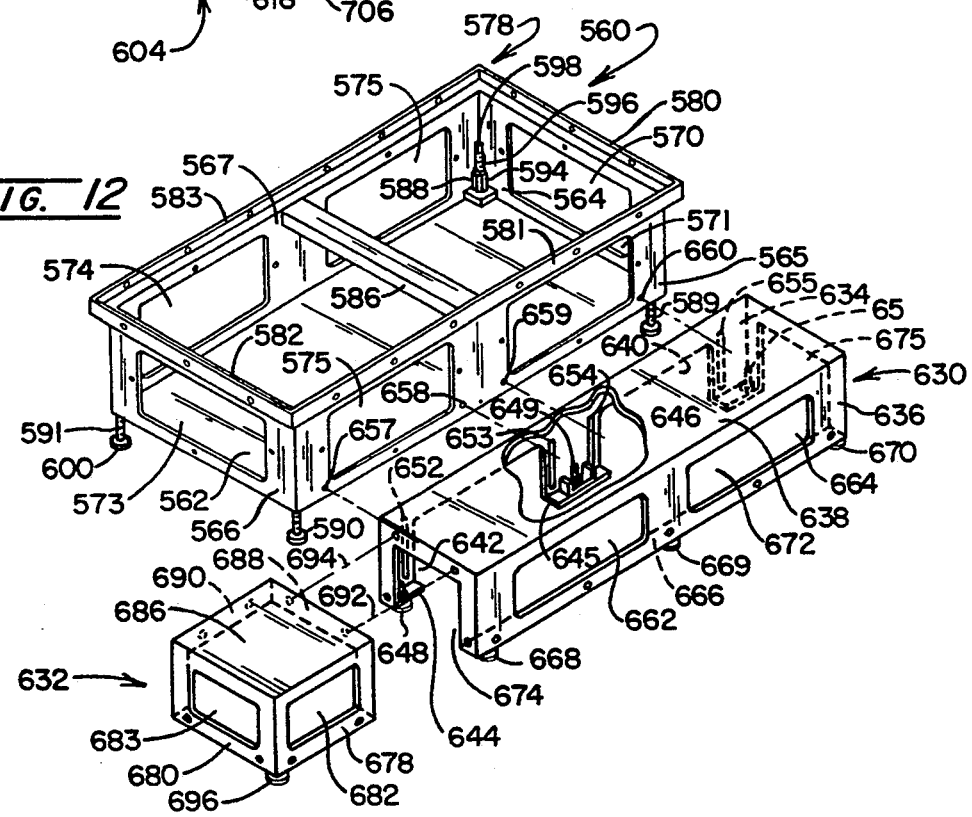
FIG. 12 is a an exploded perspective view showing a floor module frame structure and associated step structures employed with the embodiment of FIG. 11.

In general, the floor modules 550–557 are structured essentially identically as those described at 34–41 in FIGS. 1 et seq. However, the height of elevated floor surface 546 will be slightly greater than the corresponding floor surfaces of the earlier embodiment. Referring momentarily to FIG. 12, a floor module frame as is employed with the instant assemblage 548 is represented in general at 560. Module frame 560 includes a lower portion having a continuous bottom surface 562 from which extend four side panels 564–567 incorporating generally rectangular panel openings 570–575. The side panels 561–576 extend upwardly to top edges which, in turn, support a connector flange structure represented generally at 578 having offset, vertically oriented upstanding connector flanges 580–583. A cross-over support 586 provides for side panel stability and also serves as a partial seat for one edge of the abutting floor tiles used with module 560. In general, the dimensions of the module frame 560 from bottom surface 562 to the connector flange structure 578 are the same as in the earlier embodiment. However, the resulting floor module with associated floor tiles will stand higher above a given floor surface in consequence of the structuring of the floor engaging foot components 588–591 extending downwardly from bottom surface 562. While structured similarly to the component 41 described in connection with FIG. 6, the foot portions as described at 320 in FIG. 6 always are located beneath bottom surface 562, and do not retract through an opening such as at 332 shown in FIG. 6. This provides for a substantial fabrication cost reduction. In FIG. 12, exemplary foot component 588 is seen to incorporate a threaded bearing block 594 which is welded to the module at one corner of bottom surface 562. Extending through this block 594 is a component identical to that shown in FIG. 6 including a threaded stud 596 extending upwardly to a hex nut portion 598. However, the foot, for example, as seen at 600 in connection with component 591, remains below bottom surface 562. With that exception, the leveling devices perform in the same manner as the embodiments represented in FIG. 6.

Returning to FIG. 11, it may be observed that the assemblage 540 also includes a sequence of modular step structures 602–606. These step structures 602–606 are seen to be positioned in abutting adjacency against the sides 608 and 610 of assemblage 548 and serve initially to compensate for the greater height of elevated floor surface 546 by providing a step access to that floor surface. However, step structures 602–606 also serve the substantially advantageous function of retaining the cooling fluid conduits servicing the air cooling coils which, for the instant embodiment, are retained within floor modules 550 and 551 in adjacency with side 608 of the assemblage 548. This arrangement serves to facilitate the maintenance of those components and to clearly isolate fluid carrying conduits from electrical conduits. In this regard, the figure shows flexible chill water and return conduits or hoses 612 and 614 extending into the step structures 602 and 603. The conduits are tapped by "T" connectors for supplying the first cooling coil within floor module 551 and then extend to a corresponding connector (not shown) to provide fluid servicing to the cooling coil within floor module 550. Corner step structure 604 is seen to retain a condensate pump 618 having a flexible input conduit 620 extending through T connector 622 to the condensate drain pan of the cooling system within module 550 and to a similar drain pan connection 624 associated with the condensate collection pan within floor module 551. The output of pump 618 is coupled to an exhaust conduit 626 which extends through step structures 605 and 606 to an appropriate drain outlet within the facility within which system 540 is located.

Returning to FIG. 12, two exemplary step structure frames 630 and 632 are shown in association with floor module frame 560. Structure frame 630 has a generally inverted U shaped configuration with oppositely disposed floor supported side members 634 and 636 which extend upwardly a step height to a top or step surface 638. As is apparent, the height of the structure is less than that of the elevated floor surface 546. Side member 634 is formed having two openings 640 and 642 extending to the floor surface, the outer edges of which are adjacent to inward depending flanges 644–646 to which respective floor engaging foot components shown, respectively, at 648 and 650 are threadably mounted. Additionally positioned at side member 634 are elongate vertical slots 652–655 which are located in alignment with respectively associated holes 657–660 formed within side 565 of floor module frame 560.

Side 636 of the step structure frame 630 is formed having two side openings 662 and 664 and additionally includes an inwardly depending flange 666 from which three threadably engaged and adjustable floor engaging toot structures 668, 669, and 670 depend. With the arrangement shown, the step structure frame 630 may be bolted to floor module 560 through the use of bolt and nut connectors extending through the slots 652–655 into respective poles 657–660. Slots 652–655 accommodate for floor variations. Access to the step cavity 672 defined by the step structure frame 630 is provided through both end opening 674 and 675 and the side openings 662 and 664.

Step corner module frame 632 serves, as shown at 604 in FIG. 11, to provide a continuity of the step structure around a corner of assemblage 548 as well as to retain the condensate pump 618. The structure includes two side portions 678 and 680 having access openings shown, respectively, at 682–683 formed therein and which extend to a top step surface 686. Two connector flanges 688 and 690 extend downwardly from top surface 686 and incorporate spaced bolt holes intended for bolting connection with corresponding bolt holes in the sides of modules such as at 630. Two such holes are identified by alignment axes 692 and 694. A foot component 696 is coupled to an inwardly depending flange (not shown) of the structure 632.

Returning momentarily to FIG. 11, it may be observed that the outwardly disposed sides of the step structures 602–606 are covered for aesthetic purposes by fascia panels or boards, certain of which are shown at 698 and 700. Additionally, the top surfaces of the devices are covered, preferably, with tread material or the equivalent, some of which is shown at 702 and 704, and a polymeric corner molding is located between the tread and side fascia panels, two such corner molding components being shown at 706 and 708.

Referring to FIG. 13, the interrelationship of the step structure and the assemblage of floor modules is shown in enhanced detail. In the figure, step structure 602 is shown in bolted connection with floor module 551 resting upon floor surface 720. Floor tiles 722 and 724 are shown positioned upon the connector flange structure 726 of the floor module and over its cross-over support 728. Air passageway defining openings are formed within the floor tile 722 as at 730 and immediately beneath these openings is an air filter 732. Filter 732 is positioned above a chilled water coil 734 which, in turn, is positioned within the discrete cavity 736 of module 551 above a condensate collection pan 738. Note that the pan 738 slopes downwardly from the interior of module 551 towards its outside edge which is adjacent step module 602. This is the reverse of the earlier embodiment and accommodates for the collection of condensate fluid by flexible tubing 620 which is connected to the collector pan 730 at coupling 740. Extending above the pan 738 to the coil 734 are the input and output chilled water conduits which are connected to metal feed and return tubes shown, respectively, at 742 and 744. A pneumatically actuated valve 746 provides for temperature control in combination with a temperature sensing bulb-type actuator 748.

Referring to FIG. 14, an alternate blower fan assembly is shown within the cavity of module 551 at 752 as being mounted to side panel 754 with a mounting plate 756. Two blower fans 758 and 760 are seen to be mounted upon plate 756 and are simultaneously driven from a centrally disposed electric motor 762. As described in connection with FIGS. 9 and 10, the air path defining orientation of the blower assembly 752 can be altered in two directions by 90°. In this regard, a 90° alteration in one direction is represented in phantom in the figure, showing mounting plate 756 at location 76′ in combination with blower fans 758 and 760 being shown at 758′ and 760′ in combination with motor 762 being shown at 762′. The opposite orientation of the assembly 752 is shown with mounting plate 756 being positioned at 756" against the opposite side of module 551. This positions the blower fans as shown at 758" and 760" in combination with the motor at 762".

Returning to FIG. 13, the toot structures as earlier described in connection with FIG. 12 are shown at a higher level of detail, for example at 764–766. Module 551 is seen coupled to module 552 in the manner earlier disclosed, i.e. by the attachment of upstanding abutting flanges 768 and 769. This defines a gap 770 between the modules and the air flow path therebetween is further established through the selective utilization of elastomeric foam gaskets as at 772 and 774.

Referring to FIG. 15, an alternate embodiment for selectively blocking the side panel opening of the floor modules and for, where appropriate, establishing an air path is revealed. In the figure, a floor module 776 is connected to an adjacent floor module 778 at their abutting connector flange structures respectively represented generally at 780 and 782. Thus, a gap 784 is developed between the modules. Within this gap 784, there is positioned an elastomeric foam gasket 786 which is configured having a partially, cut-through or die cut knock-out insert corresponding with the shape of an associated oppositely disposed pair of panel openings. The die cut positioning in the figure is shown partially in dashed form at 788 and 790 adjacent the panel openings 792 and 794 of respective floor modules 776 and 778.

With the higher structure involved in the instant embodiment, a space is located immediately beneath the gaps as at 784 as represented at 796. This space advantageously may be employed for the purpose of routing coolant fluid lines to interior areas of more complex assemblages of floor modules. Such fluid carrying conduit is shown in the figure at 797 and 798. By so positioning this fluid carrying function, it is separated from electrical conduit components. Alternately, electrical cables may be so distributed.

Figure 16:
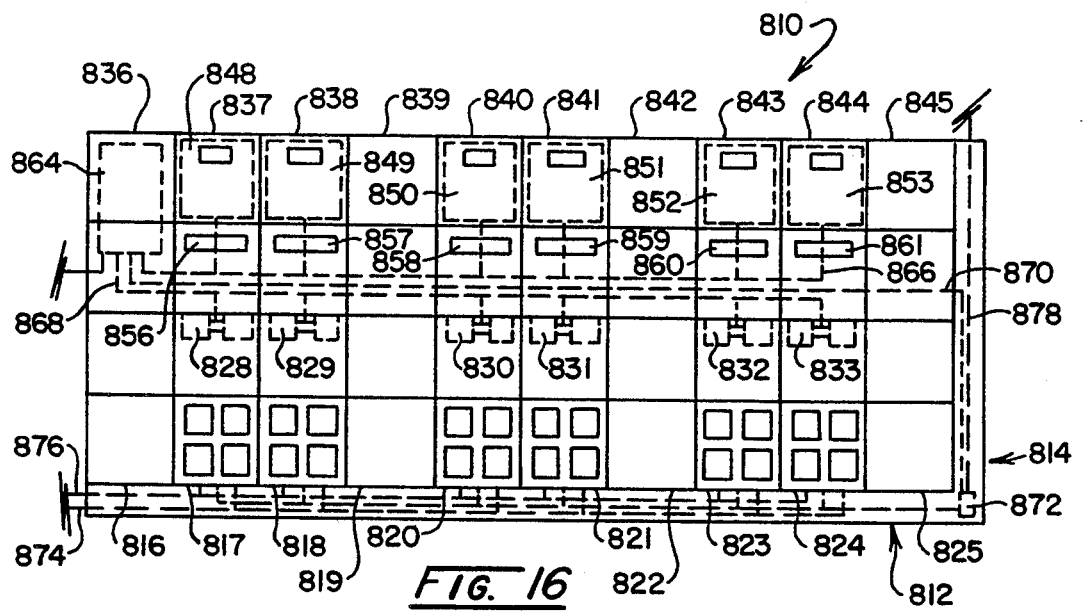
FIG. 16 is a top view of a floor module assemblage and associated step structure according to the invention schematically showing the positioning of fluid carrying conduits and power distribution conduits.

Looking to FIG. 16, a floor module assemblage 810 is shown in plan view as it is associated with side positioned step structures 812 and 184. The figure shows the advantageous isolation of cooling fluid carrying conduits from the electrical distribution lines within the assemblage 810. In the figure, a sequence of ten adjacently disposed floor modules 816–825 are positioned such that their widthwise edges are coupled with side structure 812. Of these floor modules, those at 817, 818; 820, 821; and 823, 824 carry cooling coils and blower fan assemblies which are shown in phantom, respectively at 828–833. Connected with the floor modules 816–825 are corresponding power supply supporting floor modules 836–845. Of these floor modules, those at 837, 838; 840, 841: and 843, 844 carry UPS devices represented, respectively, at 848–853. Those same modules also are provided with floor tiles carrying earlier-described air outlets over which computer system components are positioned. The outlets for the modules are represented, respectively, at 856–861. Supplying power to the UPS components 848–853 is a power distribution network within floor module 836 as shown at 864. The power distribution from network 864 to the UPS devices 848–853 is represented by dashed line 866, while the corresponding power to blower fan assemblies 828–833 is represented at dashed line 868. One other dashed line at 870 is shown as being directed to a condensation pump 872 at the corner component intermediate step structures 812 and 814.

Liquid cooling inputs to the cooling coil assemblies in modules 817, 818; 820, 821; and 823, 824 are provided from within step structure 812 as represented by the input and return dashed lines 874 and 876. From the foregoing, it may be observed that there is an ideal separation between power distribution conduits and cooling fluid carrying conduits with the exception of the condensate pump 872 output represented at dashed line 878 within step structure 814 which is adjacent to the power input to that pump. However, the opportunity for liquid movement through the conduit represented by line 878 is quite remote for most installations.

Figure 17:
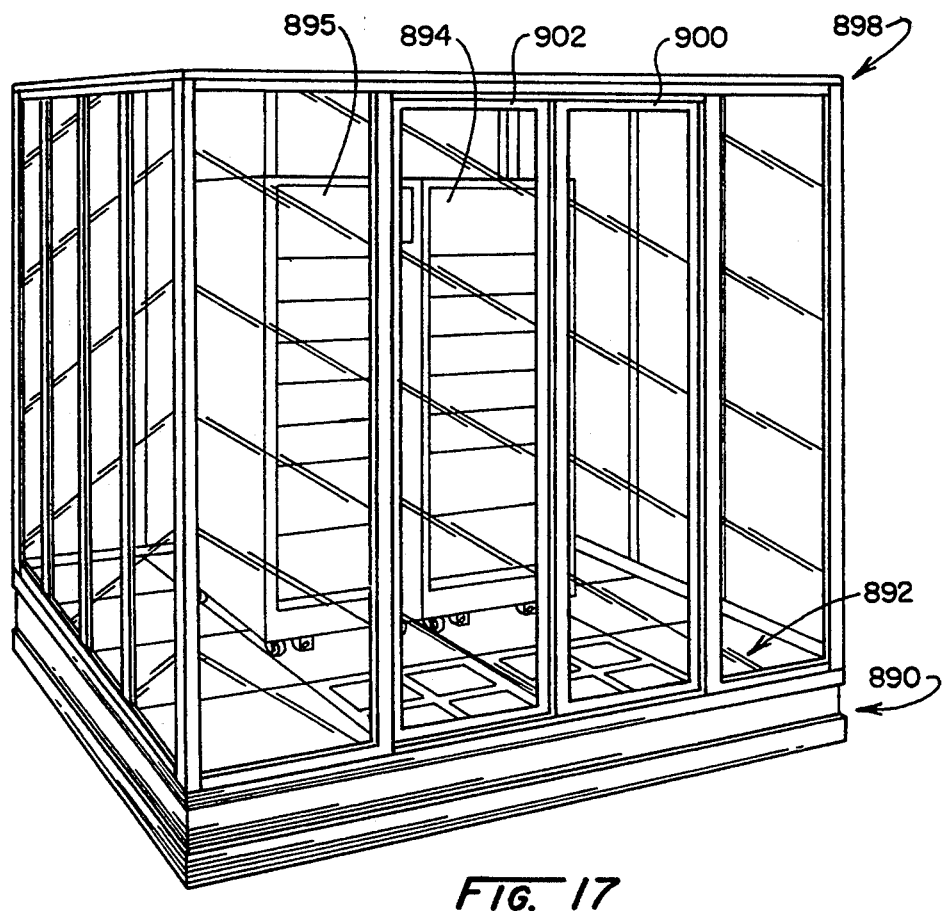
FIG. 17 is a pictorial representation of an embodiment of the system of the invention showing a floor module assemblage in combination with an environmental confinement enclosure.

Some installations of computer systems require their positioning not in an office environment but in somewhat harsh environments as may be encountered in the chemical or metals industries. Additionally, for some installations, dedicated fire protection for the computer components may be desired. Typically, for conventional sealed computer room installations, this fire protection is provided with Halon gas based systems. In general, this gas is a fluorocarbon which has undesirable environmental-atmospheric effects upon its being released to the atmosphere. Accordingly, a restricted envelope which limits the extent of its use is desirable. Looking to FIG. 17, an assemblage of floor modules identical to that, for example, shown in FIG. 1 is shown in general at 890. The elevated floor surface shown generally at 892 for assemblage 890 is seen to support two side-by-side computer system components 894 and 895. To protect these components 894 and 895 from harsh atmosphere and/or to confine them for dedicated fire protection purposes, an environmental confinement enclosure 898 is positioned over them and upon the outer edge of elevated floor surface 892. Access to the computer system components 894 and 895 within this enclosure 898 is provided, for example, by sliding doors 900 and 902. Additionally not shown in the figure is a Halon based fire protection system. It may be observed that a substantially smaller amount of this fluorocarbon gas is required for providing protection for components 894 and 895, the enclosure 898 covering a floor surface, for example, of about 8 ft×8 ft with a height of, for example, 7 ft.

Since certain changes may be made in the above-described system and apparatus without departing from the scope of the invention herein involved, it is intended that all matter contained in the above description or shown in the accompanying drawings shall be interpreted as illustrative and not in a limiting sense.

I claim:

1. A floor supported substructure system for a computer system component having a given base peripheral configuration with a base region through which heat removing air may enter, said system component having given operational heat dissipation and power consumption characteristics, comprising:

a plurality of floor modules, each having a lower portion supported from said floor and having side portions extending upwardly therefrom to support an elevated floor surface at a given height and defining a chamber intermediate said lower portion and said elevated floor surface;

the said elevated floor surface of a first said floor module supporting said computer system component and having an air outlet formed therein for providing air transfer communication to said base region;

second and third said floor modules positioned in adjacency with said first module and oriented to effect a substantial alignment of said elevated floor surfaces thereof:
a said floor module chamber retaining an air circulation blower having an input and an air flow output to provide a discrete said floor module providing said air flow output at a capacity corresponding with said heat dissipation characteristic; and
an air flow path defined by at least one said chamber extending from said blower airflow output to said air outlet.

2. The system of claim 1 wherein a said floor module chamber retains an uninterruptible power supply having an output capacity corresponding with said power consumption characteristic and having a power output connectable in power supply relationship with said computer system component to provide a discrete said floor module dedicated to supplying said power output.

3. The system of claim 1 wherein a said floor module chamber retains a cooling coil having a cooling capacity corresponding with said operational heat dissipation characteristic, within an air path extending to said air circulation blower input.

4. The system of claim 3 wherein a said floor module chamber retains an uninterruptible power supply having an output capacity corresponding with said power consumption characteristic, said uninterruptible power supply being located within said air flow path in downstream relationship with respect to said air outlet and defining a discrete said floor module dedicated to providing said output capacity.

5. The system of claim 1 in which:
said floor module lower portion comprises a rectangular continuous bottom surface and floor engaging adjustable foot components extensible downwardly from the corners thereof and manually adjustable to effect leveling of said elevated floor surface;
said side portions are provided as four, panel portions extending upwardly from said bottom surface to define a top edge, select ones thereof having panel openings formed therein; and
at least one rigid, rectangular floor tile removably supportable at said top edge for support by said four panel portions, the upwardly disposed surface thereof providing said elevated floor surface.

6. The system of claim 5 in which:
said floor module lower portion rectangular bottom surface has a predetermined widthwise extent and a lengthwise extent substantially twice said widthwise extent;
including a crossover support extending widthwise between said panel portions which extend along said lengthwise extent; and
said elevated floor surface is provided as two substantially square said rigid floor tiles.

7. The system of claim 5 in which:
said computer system component is movably supported upon spaced apart wheels mounted at said base region; and
including a ramp assemblage comprising two ramps each formed having two ramp members foldably coupled together at a hinge connection, one end of a said ramp member being hingedly coupled with a bridging member extensible to and supportable upon a said floor tile, each said ramp including a downwardly depending flange engaging coupler located adjacent said bridging member and configured for abuttable positioning over a said side portion top edge, said ramps being positionable in spaced apart relationship corresponding with said spaced apart wheels for receiving said wheels and supporting said computer system component for movement onto and off of said assemblage elevated floor.

8. A floor supported substructure system for a computer component having a given base peripheral configuration with a base region through which heat removing air may enter, said system component having given operational heat dissipation and power consumption characteristics, comprising:
a plurality of floor modules, each having a lower portion supported from saint floor and having side portions extending upwardly therefrom to support an elevated floor surface at a given height and defining a discrete chamber intermediate said lower portion said elevated floor surface;
said floor module lower portion comprising a rectangular continuous bottom surface and floor engaging adjustable foot components extensible downwardly from the corners thereof and manually adjustable to effect leveling of said elevated floor surface;
said side portions being provided as four, panel portions extending upwardly from said bottom surface to define a top edge, select ones thereof having panel openings formed therein and having a connector flange structure fixed to and outwardly offset from said top edge;
at least one rigid, rectangular floor tile removably positionable in nesting relationship within said connector flange structure for support by said four panel portions, the upwardly disposed surface thereof providing said elevated floor surface;
the said elevated floor surface of a first said floor module supporting said computer system component and having an air outlet formed therein for providing air transfer communication to said base region;
a said floor module discrete chamber retaining an air circulation blower having an input and an air flow output;
an air flow path defined by at least one said discrete chamber extending from said blower airflow output to said air outlet;
second and third said floor modules positioned in adjacency with said first floor module and oriented to effect a substantial alignment of said elevated floor surfaces thereof.

9. The system of claim 8 in which:
said second and third floor modules are removably connected with said first floor module at the abutting said connector flange structures thereof to define a gap intermediate said panel portions;
said air flow path is defined by blocking means for closing select said panel openings.

10. The system of claim 1 wherein a said floor module chamber retains a power distribution network having circuit breaker protection, and having an output connected in power supply relationship with said air circulation blower to define a discrete said floor module dedicated to providing said power distribution network output.

11. The system of claim 1 in which said elevated floor surface given height is about ten inches.

12. The system of claim 1 in which each said floor module is configured to provide a said elevated floor surface having a rectangular periphery with dimensions of about two feet by four feet.

13. The system of claim 1 including an environmental confinement enclosure positioned over said elevated floor surface having side walls extending from said elevated floor surface to a top cover located above said computer system component, and having a normally closed access opening for accessing said computer system component.

14. A floor supported substructure assemblage for a computer system component having a given base peripheral configuration with a base region through which heat removing air may pass, said system component having given operational heat generation and power consumption characteristics, comprising:
   a plurality of floor modules, each having a lower portion supported upon said floor and having side portions extending upwardly therefrom to support an elevated floor surface at a given height and defining a chamber intermediate said lower portion and said elevated floor surface, said floor modules being arranged in a said assemblage to form an elevated floor of predetermined peripheral geometric shape including a linear side portion;
   a said floor module having a said side portion forming said assemblage linear side portion and having a cooling coil mounted within the said chamber thereof connectable with cooling fluid conduits, and located within an input air path extending to an air intake adjacent thereto;
   the said elevated floor surface of a said floor module supporting said computer system component and having an air outlet formed therein for providing air transfer communication with said base region;
   a said floor module chamber retaining an air circulation blower having an input for receiving air from said input air path and an air flow output;
   an air flow path defined by at least one said chamber extending from said blower air flow output to said air outlet; and
   said cooling coil and said air circulation blower having capacities corresponding with said computer system component operational heat generation characteristic.

15. A floor supported substructure assemblage for a computer system component having a given base peripheral configuration with a base region through which heat removing air may pass, said system component having given operational heat generation and power consumption characteristics, comprising:
   a plurality of floor modules, each having a lower portion supported upon said floor and having side portions extending upwardly therefrom to support an elevated floor surface at a given height and defining a discrete chamber intermediate said lower portion and said elevated floor surface, said floor modules being arranged in a said assemblage to form elevated floor of predetermined peripheral geometric shape including a linear side portion;
   a said floor module having a said side portion forming said assemblage linear side portion and having a cooling coil mounted within the said discrete chamber thereof connectable with cooling fluid conduits, and located within an input air path extending to an air intake adjacent thereto;
   a step structure having oppositely disposed floor supported side members extending upwardly a step height less than said floor module given height to a step surface, and defining a step cavity therewithin, one said side member being positioned in abutting adjacency with said assemblage linear side portion;
   said cooling fluid conduits being located within said step cavity and coupled with said cooling coil;
   the said elevated floor surface of a said floor module supporting said computer system component and having an air outlet formed therein for providing air transfer communication with said base region;
   a said floor module discrete chamber retaining an air circulation blower having an input for receiving air from said input air path and an air flow output; and
   an air flow path defined by at least one said discrete chamber extending from said blower air output to said air outlet.

16. The substructure assemblage of claim 15 wherein a first said floor module retains said air circulation blower and said cooling coil within the said chamber thereof.

17. The substructure assemblage of claim 14 in which said air outlet is within the said elevated floor surface of a second said floor module; and
   wherein an uninterruptible power supply having an output capacity corresponding with said power consumption characteristic is retained within the said chamber of said second module and includes an output connectable in power supply relationship with said computer system component.

18. The substructure assemblage of claim 14 in which an uninterruptible power supply having an output capacity corresponding with said power consumption characteristic is mounted within the said cavity of a second said floor module, and includes a power output connectable in power supply relationship with said computer system component to define a discrete said floor module dedicated to providing said power output.

19. The substructure assemblage of claim 14 in which a power distribution network having circuit breaker protection is mounted within the chamber of a third said floor module and having an output connectable in power supply relationship with said air circulation blower to define a discrete said third floor module dedicated to providing said power distribution network output.

20. The substructure assemblage of claim 14 in which:
   each said floor module lower portion comprises a rectangular continuous bottom surface and floor engaging adjustable foot components extensible downwardly from the corners thereof and manually adjustable to effect leveling of said elevated floor surface;
   said side portions are provided as four, panel portions extending upwardly from said bottom surface to define a top edge, select ones thereof having panel openings formed therein; and
   at least one rigid, rectangular floor tile removably supportable at said top edge for support by said four panel portions, the upwardly disposed surface thereof providing said elevated floor surface.

21. A floor supported substructure assemblage for a computer system component having a given base peripheral configuration with a base region through which heat removing air may pass, said system component having given operational heat generation and power consumption characteristics, comprising:

a plurality of floor modules, each having a lower portion supported upon said floor and having side portions extending upwardly therefrom to support an elevated floor surface at a given height and defining a discrete chamber intermediate said lower portion and said elevated floor surface, said floor modules being arranged in a said assemblage to form an elevated floor of predetermined peripheral geometric shape including a linear side portion;

each said floor module lower portion comprising a rectangular continuous bottom surface and floor engaging adjustable foot components extensible downwardly from the corners thereof and manually adjustable to effect leveling of said elevated floor surface;

said side portions being provided as four, panel portions extending upwardly from said bottom surface to define a top edge, select ones thereof having panel openings formed therein and having a connector flange structure fixed to and outwardly offset from said top edge;

at least one rigid, rectangular floor tile removably positionable in nesting relationship within said connector flange structure for support by said four panel portions, the upwardly disposed surface thereof providing an elevated floor surface;

a said floor module having a said side portion forming said assemblage linear side portion and having a cooling coil mounted within the said discrete chamber thereof connectable with cooling fluid conduits, and located within an input air path extending to an air intake formed within said module adjacent thereto;

the said elevated floor surface of a said floor module supporting said computer system component and having an air outlet formed therein for providing air transfer communication to said base region;

a said floor module discrete chamber retaining an air circulation blower having an input for receiving air from said input air path and an air flow output; and an air flow path defined by at least one said discrete chamber extending from said blower air output to said air outlet.

22. The substructure assemblage of claim 21 in which adjacent ones of said floor modules of said assemblage are interconnected at the mutually abutting said connector flange structures thereof to define a gap intermediate said panel portions; and said air path is defined by blocking means for closing select said panel openings.

23. The substructure assemblage of claim 21 in which:

said computer system component is movably supported upon spaced apart wheels mounted at said base region;

including a ramp assemblage comprising two ramps each formed of two ramp members foldably coupled together at a hinge connection, one end of a said ramp member being hingedly coupled with a bridging member extensible to and supportable upon a said floor tile at a location over said crossover support, each said ramp including a downwardly depending flange engaging coupler configured for abuttable positioning over a said side portion top edge, said ramps being positionable in spaced apart relationship corresponding with said spaced apart wheels for receiving said wheels and supporting said computer system component for movement onto and off of said assemblage elevated from 24. The substructure of claim 14 including an environmental confinement enclosure positioned over said assemblage elevated floor surface, having side walls extending from said elevated floor surface to a top cover located above said computer system component, and having a normally closed access opening for accessing said computer system component.

25. A floor module for use in assembling a floor supported sub-structure configured to support a computer system component having given operational heat generation and power consumption characteristics, comprising:

a frame having a rectangular bottom surface and four side panels extending upwardly therefrom to an edge portion defining four corners and having air transfer openings formed therein, and a flange connector structure including a seat flange extending horizontally outwardly from said edge portion to an upstanding connector flange;

a vertically adjustable floor engaging foot component mounted to said frame in the vicinity of each said corner;

at least one floor tile positionable upon said frame over said seat flange anti defining a discrete cavity therewith; and blocking means positionable in abutment with select said side panels for blocking the flow of air through an adjacent said air transfer opening.

26. The floor module of claim 25 including an air circulation blower mounted within said frame and having an upstream air inlet and an air output positioned adjacent a selective said air transfer opening.

27. The floor module of claim 26 including a cooling coil having a cooling capacity corresponding with said operational heat generation characteristics mounted with said frame.

28. The floor module of claim 25 including an uninterruptible power supply having an output capacity corresponding with said power consumption characteristic mounted within said frame and having an output connectable in power supply relationship with said computer system component.

29. The floor module of claim 28 including an air outlet formed within said floor tile and communicating in air transfer relationship with said discrete cavity.

30. The floor module of claim 25 including a power distribution network having circuit breaker protection mounted within said frame.

31. The floor module of claim 25 in which:

said frame flange connector structure is configured for supporting two adjacently positioned said floor tiles having square peripheries; and including a crossover support extending between oppositely disposed said side panels at the level of said seat flange and located to support the mutually adjacently disposed edges of said two floor tiles.

32. The floor module of claim 25 in which:

said frame bottom surface is foraged having openings adjacent each of said four corners, and each said foot component is retractable within said discrete chamber through an adjacent said opening within said bottom surface.

33. The system of claim 9 in which said blocking means includes a compressible foam gasket dimensioned to be substantially co-extensive with a said panel portion and having a widthwise extent corresponding with the width of said gap.

34. The system of claim 8 in which:
said floor module lower portion rectangular bottom surface has a predetermined widthwise extent and a lengthwise extent substantially twice said widthwise extent;
including a crossover support extending between said panel portions which extends along said lengthwise extent; and
said elevated floor surface is provided as two substantially square said rigid floor tiles.

35. The system of claim 8 in which:
said computer system component is movably supported upon spaced apart wheels mounted at said base region; and
including a ramp assemblage comprising two ramps each formed having two ramp members foldably coupled together at a hinge connection, one end of a said ramp member being hingedly coupled with a bridging member extensible to and supportable upon a said floor tile, each said ramp including a downwardly depending flange engaging coupler located adjacent said bridging member and configured for abuttable positioning over a said connector flange structure, said ramps being positionable in spaced apart relationship corresponding with said spaced apart wheels for receiving said wheels and supporting said computer system component for movement onto and off of said assemblage elevated floor.

36. The substructure assemblage of claim 15 including:
a condensate collection pan mounted within said discrete chamber below said cooling coil and having a drain conduit extending therefrom into said step cavity; and
a condensate pump located within said step cavity and having an input coupled with said drain conduit.

37. The substructure of claim 15 wherein a said floor module having a said side portion forming an assemblage linear side portion retains an uninterruptible power supply having an output capacity corresponding with said power consumption characteristics and having an output connectable in power supply relationship with said computer system component.

38. The substructure of claim 15 wherein a said floor module having a said side portion forming an assemblage linear side portion retains a power distribution network having circuit breaker protection and having an output connected in power supply relationship with said air circulation blower.

39. The substructure assemblage of claim 21 in which:
said floor module lower portion rectangular bottom surface has a predetermined widthwise extent and a lengthwise extent substantially twice said widthwise extent;
including a crossover support extending between said panel portions extending along said lengthwise extent; and
said elevated floor surface is provided as two substantially square said rigid floor tiles.

40. The substructure assemblage of claim 20 in which:
said floor module lower portion rectangular bottom surface has a predetermined widthwise extent and a lengthwise extent substantially twice said widthwise extent;
including a crossover support which extend between said panel portions extending along said lengthwise extent; and
said elevated floor surface is provided as two substantially square said rigid floor tiles.

41. The substructure assemblage of claim 39 in which:
said computer system component is movably supported upon spaced apart wheels mounted at said base region; and
including a ramp assemblage comprising two ramps each formed of two ramp members foldably coupled together at a hinge connection, one end of a said ramp member being hingedly coupled with a bridging member extensible to and supportable upon a said floor tile at a location over said crossover support, each said ramp including a downwardly depending flange engaging coupled configured for abuttable positioning over a said connector flange structure, said ramps being positionable in spaced apart relationship corresponding with said spaced apart wheels for receiving said wheels and supporting said computer system component for movement onto and off of said assemblage elevated floor.

* * * * *